United States Patent
Presley et al.

(10) Patent No.: US 8,190,025 B2
(45) Date of Patent: May 29, 2012

(54) WAVELENGTH SELECTIVE SWITCH HAVING DISTINCT PLANES OF OPERATION

(75) Inventors: Harry W. Presley, Suwanee, GA (US); Michael L. Nagy, Lawrenceville, GA (US)

(73) Assignee: Olympus Corporation (JP)

( * ) Notice: Subject to any disclaimer, the term of this patent is extended or adjusted under 35 U.S.C. 154(b) by 792 days.

(21) Appl. No.: 12/220,356

(22) Filed: Jul. 23, 2008

(65) Prior Publication Data
US 2009/0220233 A1 Sep. 3, 2009

Related U.S. Application Data

(60) Provisional application No. 61/067,635, filed on Feb. 28, 2008.

(51) Int. Cl.
*H04J 14/00* (2006.01)

(52) U.S. Cl. ........... 398/48; 398/45; 398/49; 398/50; 398/56; 398/57; 398/82; 398/83; 398/79; 398/84; 398/85; 398/87; 398/88; 385/24; 385/37; 385/16; 385/17; 385/18; 359/850; 359/566; 359/569; 356/330; 356/331; 356/325; 356/327

(58) Field of Classification Search .......... 398/48, 398/49, 50, 45, 79, 82, 83, 84, 81, 85, 86, 398/87, 88, 46, 47, 51, 52, 53, 54, 55, 56, 398/57, 59, 58, 66, 68, 147, 158, 159, 161; 385/16, 17, 18, 24, 37, 27, 22, 10; 359/201.2, 359/204.1, 566, 569, 572, 850; 356/330, 356/477, 331, 325, 327

See application file for complete search history.

(56) References Cited

U.S. PATENT DOCUMENTS

| | | | |
|---|---|---|---|
| 3,622,792 A | 11/1971 | Piccininni |
| 4,012,147 A | 3/1977 | Walrafen |
| 4,076,421 A | 2/1978 | Kishner |
| 4,655,547 A | 4/1987 | Heritage et al. |
| 4,678,332 A | 7/1987 | Rock et al. |
| 4,790,654 A | 12/1988 | Clarke |
| 4,866,699 A | 9/1989 | Brackett et al. |
| 4,983,039 A | 1/1991 | Harada et al. |
| 5,130,835 A | 7/1992 | Stegmeier |
| 5,166,818 A | 11/1992 | Chase et al. |
| 5,226,099 A | 7/1993 | Mignardi et al. |

(Continued)

FOREIGN PATENT DOCUMENTS
EP 0 548 830 6/1993
(Continued)

OTHER PUBLICATIONS

Timofeev, F.N. et al., "1.5um Free-Space Grating Multi/Demultiplexer and Routing Switch," Electronics Letters, vol. 32, No. 14, pp. 1307-1308, Jul. 4, 1996.

(Continued)

*Primary Examiner* — Hanh Phan
(74) *Attorney, Agent, or Firm* — Mathew L. Grell; Balser & Grell IP Law

(57) ABSTRACT

A wavelength selective switch utilizing aperture-shared optics and functionally distinct planes of operation that enables high fiber port counts, such as 1×41, and multiplicative expansion, such as to 1×83 or 1×145, by utilizing elements optimized for performance in one of the functionally distinct planes of operation without affecting the other plane.

80 Claims, 16 Drawing Sheets

U.S. PATENT DOCUMENTS

| | | | |
|---|---|---|---|
| 5,233,405 | A | 8/1993 | Wildnauer et al. |
| 5,255,332 | A | 10/1993 | Welch et al. |
| 5,305,402 | A | 4/1994 | Hill et al. |
| 5,414,540 | A | 5/1995 | Patel et al. |
| 5,436,986 | A | 7/1995 | Tsai |
| 5,444,801 | A | 8/1995 | Laughlin |
| 5,504,575 | A | 4/1996 | Stafford |
| 5,581,643 | A | 12/1996 | Wu |
| 5,610,757 | A | 3/1997 | Ji et al. |
| 5,627,925 | A | 5/1997 | Alferness et al. |
| 5,633,755 | A | 5/1997 | Manabe et al. |
| 5,671,304 | A | 9/1997 | Duguay |
| 5,768,006 | A | 6/1998 | Min et al. |
| 5,796,479 | A | 8/1998 | Derickson et al. |
| 5,841,917 | A | 11/1998 | Jungerman et al. |
| 5,878,177 | A | 3/1999 | Karasan et al. |
| 5,920,417 | A | 7/1999 | Johnson |
| 5,960,132 | A | 9/1999 | Lin |
| 5,960,133 | A | 9/1999 | Tomlinson |
| 6,028,689 | A | 2/2000 | Michalicek et al. |
| 6,072,923 | A | 6/2000 | Stone |
| 6,097,859 | A | 8/2000 | Solgaard et al. |
| 6,204,919 | B1 | 3/2001 | Barshad et al. |
| 6,212,309 | B1 | 4/2001 | Nguyen et al. |
| 6,263,123 | B1 | 7/2001 | Bishop et al. |
| 6,289,145 | B1 | 9/2001 | Solgaard et al. |
| 6,327,398 | B1 | 12/2001 | Solgaard et al. |
| 6,374,008 | B2 | 4/2002 | Solgaard et al. |
| 6,389,190 | B2 | 5/2002 | Solgaard et al. |
| 6,434,290 | B1 | 8/2002 | Berthold |
| 6,456,751 | B1 | 9/2002 | Bowers et al. |
| 6,487,334 | B2 | 11/2002 | Ducellier et al. |
| 6,507,685 | B1 | 1/2003 | Polynkin et al. |
| 6,535,664 | B1 | 3/2003 | Anderson |
| 6,539,142 | B2 | 3/2003 | Lemoff et al. |
| 6,542,657 | B2 | 4/2003 | Anderson |
| 6,560,384 | B1 | 5/2003 | Helkey et al. |
| 6,571,030 | B1 | 5/2003 | Ramaswami et al. |
| 6,606,427 | B1 | 8/2003 | Graves |
| 6,614,073 | B1 | 9/2003 | Sakamoto |
| 6,694,073 | B2 | 2/2004 | Golub et al. |
| 6,711,316 | B2 | 3/2004 | Ducellier |
| 6,711,320 | B2 | 3/2004 | Solgaard et al. |
| 6,728,433 | B1 | 4/2004 | Bowers et al. |
| 6,757,458 | B2 | 6/2004 | Neilson et al. |
| 6,760,511 | B2 | 7/2004 | Garrett et al. |
| 6,787,745 | B2 | 9/2004 | Hajjar et al. |
| 6,792,177 | B2 | 9/2004 | Welsh et al. |
| 6,798,941 | B2 | 9/2004 | Smith et al. |
| 6,798,992 | B1 | 9/2004 | Bishop et al. |
| 6,801,684 | B2 | 10/2004 | Losch |
| 6,810,165 | B2 | 10/2004 | Golub et al. |
| 6,826,330 | B1 | 11/2004 | Godil et al. |
| 6,834,136 | B2 | 12/2004 | Solgaard et al. |
| 6,847,749 | B1 | 1/2005 | Spremo et al. |
| 6,885,807 | B2 | 4/2005 | Riza |
| 6,898,341 | B2 | 5/2005 | Huang et al. |
| 6,922,239 | B2 | 7/2005 | Solgaard et al. |
| 6,922,529 | B2 | 7/2005 | Bortz |
| 6,931,196 | B2 | 8/2005 | Livas et al. |
| 6,952,260 | B2 | 10/2005 | Xiao |
| 6,967,718 | B1 | 11/2005 | Carlisle et al. |
| 7,060,964 | B1 | 6/2006 | Pi et al. |
| 7,263,253 | B2 | 8/2007 | Davis et al. |
| 7,265,827 | B2 | 9/2007 | Slutter |
| 7,268,869 | B2 | 9/2007 | Baluswamy |
| 7,277,608 | B2 | 10/2007 | Isomura et al. |
| 2002/0196496 | A1* | 12/2002 | Silveira et al. ............... 359/128 |
| 2003/0223748 | A1* | 12/2003 | Stowe et al. .................. 398/48 |
| 2004/0136648 | A1 | 7/2004 | Chen et al. |
| 2004/0252938 | A1* | 12/2004 | Ducellier et al. ............. 385/27 |
| 2005/0213978 | A1* | 9/2005 | Yamashita et al. ............. 398/79 |
| 2005/0220394 | A1 | 10/2005 | Yamamoto et al. |
| 2006/0067611 | A1* | 3/2006 | Frisken et al. ................ 385/16 |
| 2006/0103952 | A1* | 5/2006 | Gouch ......................... 359/737 |

FOREIGN PATENT DOCUMENTS

| JP | 2617054 | 4/1993 |
|---|---|---|

OTHER PUBLICATIONS

Koga, Masafumi et al., "Design and Performance of an Optical Path Cross-Connect System Based on Wavelength Path Concept," Journal of Lightwave Technology, vol. 14, No. 6, pp. 1106-1119, Jun. 1996.

Koga, Masafumi et al., "8×16 Delivery-and-Coupling-Type Optical Switches for a 320-Gbitls Throughput Optical Path Cross-Connect System," OFC/96 Technical Digest, pp. 259-261, (1996).

Toshiyoshi, Hiroshi et al., "Electrostatic Micro Torsion Mirrors for an Optical Switch Matrix," Journal of Microelectromechanical Systems, vol. 5, No. 4, pp. 231-237, Dec. 1996.

Toshiyoshi, Hiroshi et al., "An Electrostatically Operated Torsion Mirror for Optical Switching Device," presented at Transducer's 95 Eurosensors IX (Conference on Solid State Sensors and Actuator) Stockholm, Sweden, pp. 297-300, Jun. 25-29, 1995.

Okamoto, Satoru et al., "Optical Path Cross-Connect Node Architectures for Photonic Transport Network," Journal of Lightwave Technology, vol. 14, No. 6, pp. 1410-1422, Jun. 1996.

Okamoto, Satoru et al., "Optical Path Cross-Connect Systems for Photonic Transport Networks," NTT Transmission Systems Laboratories, IEEE, pp. 474-480, (1993).

Sato, Ken-ichi et al., "Optical Paths and Realization Technologes," NTT Optical Nework Systems Laboratories, IEEE, pp. 1513-1520, (1994).

Patel, J.S. et al., "Liquid Crystal and Grating-Based Multiple-Wavelength Cross-Connect Switch," IEEE Photonics Technology Letters, vol. 7, No. 5, pp. 514-516, May, 1995.

Jeong, et al_, "Comparision of Wavelength-Interchanging and Wavelength-Selective Cross-Connects in Multiwavelength All-Optical Networks," Proceedings of 1996 15th Annual Joint Conference of IEEE Computer and Communications Societies, INFOCOM '96, Pt. 1 (of 3), pp. 156-163, 1996.

Toshiyoshi, Hiroshi et al., "Optical Crossconnection by Silicon Micromachined Torsion Mirrors," IEEE/LEOS 1996 Summer Topical Meetings, Advanced Applications of Lasers in Materials Processing/Broadband Optical Networksl Smart Pixels/Optical MEMs and Their Applications, pp. 63-64, Aug. 5-9, 1996.

T. Gus McDonald et al., "4×4 Fiber Optic Crossbar Switch Using the Deformable Mirror Device," Paper presented at the Spatial Light Modulators and Applications Topical Meeting, pp. 80-83, Sep. 10-12, 1990, Incline Village, NV, IEEE LEOS and OSA Photonics Reports Technical Digest Series, vol. 14, (1990).

Self, S.A., "Focusing of Spherical Gaussian Beams," Applied Optics, vol. 22, pp. 658 (1983).

Wagner, R.E., et al., "Coupling Efficiency of Optics in Single-Mode Fiber Components," Applied Optics, vol. 21, pp. 2671 (1982).

St-Amant, Y., et al., "Intrinsic Properties of the Optical Coupling Between Axisymmetric Gaussian Beams," Applied Optics, vol. 43, No. 30, pp. 5691 (2004).

U.S. Appl. No. 60/857,441, filed Nov. 7, 2006, Presley, Harry W., et al.

U.S. Appl. No. 11/811,928, filed Jun. 12 2007, Presley, Harry W., et al.

U.S. Appl. No. 11/975,242, filed Oct. 18, 2007, Presley, Harry W., et al.

U.S. Appl. No. 11/977,690, filed Oct. 25, 2007, Presley, Harry W., et al.

U.S. Appl. No. 11/980,974, filed Oct. 30, 2007, Presley, Harry W., et al.

* cited by examiner

WAVELENGTH SELECTIVE SWITCH HAVING DISTINCT PLANES OF OPERATION

PRIORITY CLAIM TO RELATED US APPLICATIONS

To the full extent permitted by law, the present United States Non-Provisional patent application claims priority to and the full benefit of United States Provisional patent application entitled "Wavelength Selective Switch Having Distinct Planes of Operations", filed on Feb. 28, 2008, having assigned Ser. No. 61/067,635, incorporated entirely herein by reference.

TECHNICAL FIELD

The present invention relates generally to optical communications, and more specifically relates to wavelength division multiplexing.

BACKGROUND OF THE INVENTION

Modern communications networks are increasingly based on silica optical fiber which offers very wide bandwidth within several spectral wavelength bands. At the transmitter end of a typical point-to-point fiber optic communications link, an electrical data signal is used to modulate the output of a semiconductor laser emitting, for example, in the 1525-1565 nanometer transmission band (the so-called C-band), and the resulting modulated optical signal is coupled into one end of the silica optical fiber. On sufficiently long links, the optical signal may be directly amplified along the route by one or more amplifiers, for example, optically-pumped erbium-doped fiber amplifiers (EDFAs). At the receiving end of the fiber link, a photodetector receives the modulated light and converts it back to its original electrical form. For very long links, the optical signal risks becoming excessively distorted due to fiber-related impairments, such as, chromatic and polarization dispersion, and by noise limitations of the amplifiers, and may be reconstituted by detecting and re-launching the signal back into the fiber. This process is typically referred to as optical-electrical-optical (OEO) regeneration.

In recent developments, the transmission capacity of fiber optic systems has been greatly increased by wavelength division multiplexing (WDM) in which multiple independent optical signals, differing uniquely by wavelength, are simultaneously transmitted over the fiber optic link. For example, the C-band transmission window has a bandwidth of about 35 nanometers, determined partly by the spectral amplification bandwidth of an EDFA amplifier, in which multiple wavelengths may be simultaneously transmitted. All else being equal, for a WDM network containing N number of wavelengths, the data transmission capacity of the link is increased by a factor of N. Depending on the specifics of a WDM network, the wavelength multiplexing into a common fiber is typically accomplished with devices employing a diffraction grating, an arrayed waveguide grating, or a series of thin-film filters. At the receiver of a WDM system, the multiple wavelengths can be spatially separated using the same types of devices that performed the multiplexing, and, then separately detected and output in their original electrical data streams.

Dense WDM (DWDM) systems are being designed in which the transmission spectrum includes 40, 80, or more wavelengths with wavelength spacing of less than 1 nanometer. Current designs have wavelength spacing of between 0.4 and 0.8 nanometer, or equivalently a frequency spacing of 50 to 100 GHz respectively. Spectral packing schemes allow for higher or lower spacing, dictated by economics, bandwidth, and other factors. Other amplifier types, for example Raman, that help to expand the available WDM spectrum are currently being commercialized. However, the same issues about signal degradation and OEO regeneration exist for WDM as with non-WDM fiber links. The expense of OEO regeneration is compounded by the large number of wavelengths present in WDM systems.

Modern fiber optic networks are evolving to be much more complicated than the simple point-to-point "long haul" systems described above. Instead, as fiber optic networks move into the regional, metro, and local arenas, they increasingly include multiple nodes along the fiber span, and connections between fiber spans (e.g., mesh networks and interconnected ring networks) at which signals received on one incoming link can be selectively switched between a variety of outgoing links, or taken off the network completely for local consumption. For electronic links, or optical signals that have been detected and converted to their original electrical form, conventional electronic switches directly route the signals to their intended destination, which may then include converting the signals to the optical domain for fiber optic transmission. However, the desire to switch fiber optic signals while still in their optical format, thereby avoiding expensive OEO regeneration to the largest extent possible, presents a new challenge to the switching problem.

Switching

In the most straightforward and traditional fiber switching approach, each network node that interconnects multiple fiber links includes a multitude of optical receivers, which convert the signals from optical to electrical form, a conventional electronic switch which switches the electrical data signals, and an optical transmitter which converts the switched signals from electrical back to optical form. In a WDM system, this optical/electrical/optical (OEO) conversion must be performed by separate receivers and transmitters for each of the W wavelength components on each fiber. This replication of expensive OEO components is currently slowing the implementation of highly interconnected mesh WDM systems employing a large number of wavelengths.

Another approach for fiber optic switching, implements sophisticated wavelength switching in an all-optical network. In one version of this approach, the wavelength components W from an incoming multi-wavelength fiber are de-multiplexed into different spatial paths. Individual and dedicated switching elements then route the wavelength-separated signals toward the desired output fiber port before a multiplexer aggregates the optical signals of differing wavelengths onto a single outgoing fiber. In conventional fiber switching systems, all the fiber optic switching elements and associated multiplexers and de-multiplexers are incorporated into a wavelength selective switch (WSS), which is a special case of an enhanced optical cross connect (OXC) having a dispersive element and wavelength-selective capability. Additionally, such systems incorporate lenses and mirrors which focus and reflect light, and lenslets which collimate such light.

Advantageously, all the fiber optic switching elements can be implemented in a single chip of a micro electromechanical system (MEMS). The MEMS chip generally includes a two-dimensional array of tiltable mirrors which may be separately controlled. U.S. Pat. No. 6,097,859 to Solgaard et al., describes the functional configuration of such a MEMS wavelength selective switch (WSS), which accepts wavelengths from an incoming fiber and is capable of switching them to any one of multiple outgoing fibers. The entire switching array of up to several hundred micro electromechanical system (MEMS) mirrors, can be fabricated on a chip having dimensions of less than one centimeter by techniques well developed in the semiconductor integrated circuit industry.

Solgaard et al. further describe a large multi-port (including multiple input M and multiple output N fiber ports) and multi-wavelength WDM wavelength selective switch (WSS), accomplishing this by splitting the WDM channels into their wavelength components W and switching those wavelength components W. The WSS of Solgaard et al. has the capability of switching any wavelength channel on any input fiber port to the corresponding wavelength channel on any output fiber port. Again, a wavelength channel on any of the input fibers can be switched to the same wavelength channel on any of the output fibers. Each MEMS mirror in today's WDM wavelength selective switch is dedicated to a single wavelength channel whether it tilts about one or more axes.

As fiber port counts increase, however, the size of the optics of such WDM wavelength selective switches grows quickly. In turn, the size of the device increases, and the switching element(s) must provide a greater spatial path deflection of the wavelength components. For example, where a MEMS mirror array is employed, the increased size of the device requires a greater tilt angle, increasing the cost of the MEMS mirror array, and increasing the defect rate. Furthermore, many such WDM wavelength selective switches require elements dedicated to a particular special path, i.e., tuned for a particular fiber port. Such dedicated elements increase costs by virtue of their number, but also typically require extremely high performance characteristics and low tolerances, which, likewise, increases costs.

Therefore, it is readily apparent that there is a need for an improved WDM wavelength selective switch that allows for increased fiber port counts without substantially increasing the size of the device, and at the same time, reduces the performance requirements for the components thereof, including the switching elements.

BRIEF SUMMARY OF THE INVENTION

Briefly described in a preferred embodiment, the present invention overcomes the above-mentioned disadvantages and meets the recognized need for such a device by providing a wavelength selective switch (WSS) utilizing aperture-shared optics to increase the fiber port capacity and optical performance of the WSS, while simultaneously reducing the performance requirements for individual components thereof, wherein optimization of optical performance in functionally distinct orthogonal planes is enabled.

According to its major aspects and broadly stated, the present WSS in its preferred form, comprises a plurality of fiber ports in operable communication with a dispersive element adapted to separate an optical signal into wavelength components, and a switching element adapted to direct a selected wavelength component of an optical input signal from an input fiber port to a selected one of the other fiber ports for output (a 1×N switch). In an alternate embodiment, the switching 2Q element is adapted to direct a selected wavelength component of an optical input signal from a selected one of a plurality of input fiber ports to a single output fiber port (an N×1 switch).

More specifically, the present WSS preferably comprises a plurality of fiber ports substantially aligned within a switching plane, a plurality of optical elements as disclosed herein operable with each wavelength component of each input or output signal associated with each fiber port, including a plurality of lenses, or their equivalent, a diffraction grating, or its equivalent, and a plurality of individually controllable mirrors each associated with a selected wavelength, or their equivalent. Each of the plurality of mirrors is preferably aligned within a dispersion plane, wherein the dispersion plane is substantially orthogonal with respect to the switching plane. Some elements of the wavelength selective switch, such as the diffraction grating and certain lenses, are designed to be active only in the dispersion plane. While other elements of the wavelength selective switch, such as certain other lenses, are designed to be active only in the switching plane. Still other elements of the wavelength selective switch, such as certain lenses, are designed to be active in both planes.

For example, in a preferred embodiment of the present WSS the plurality of optical elements includes, an optical telescope comprising two preferably spherical lenses, i.e., a first telescope lens and a second telescope lens, disposed between the fiber port/free-space interface and the first cylindrical lens. The first telescope lens is preferably disposed at a distance from the fiber port/free-space interface approximately equal to the focal length of the first telescope lens, and the second telescope lens is preferably disposed at a distance from the fiber port/free-space interface approximately equal to the sum of the focal length of the second telescope lens and twice the focal length of the first telescope lens. The second telescope lens is preferably further disposed at a distance from the first telescope lens approximately equal to the sum of the focal length of the second telescope lens and the focal length of the first telescope lens. The first and second telescope lenses are active in both the switching plane and the dispersion plane, and essentially form a "telescope" in front of the fiber array. A first cylindrical lens (L1) is preferably disposed at a distance from the second telescope lens, approximately equal to the sum of the focal length of the second telescope lens, and the focal length of the first cylindrical lens thereof, wherein the first cylindrical lens is active in the switching plane and passive in the dispersion plane. A second cylindrical lens (L2) is preferably disposed at a distance from the first cylindrical lens approximately equal to the sum of the focal length of the second cylindrical lens and the focal length of the first cylindrical lens thereof, wherein the second cylindrical lens is active in the switching plane and passive in the dispersion plane. A third cylindrical lens (L4) is preferably disposed at a distance from the interface between the second telescope lens and first cylindrical lens approximately equal to the sum of focal length thereof, wherein the third cylindrical lens is active in the dispersion plane and passive in the switching plane. The diffraction grating is preferably disposed at a distance from the third cylindrical lens approximately equal to the focal length of the third cylindrical lens, wherein the diffraction grating is preferably active in the dispersion plane and passive in the switching plane. The diffraction grating is additionally preferably disposed at a distance from the interface between the second telescope lens and first cylindrical lens approximately equal to the sum of twice the focal length of the first cylindrical lens and twice the focal length of the second cylindrical lens. The diffraction grating is additionally preferably disposed at a distance from the interface between the second telescope lens and first cylindrical lens approximately equal to twice the focal length of the third cylindrical lens. A third spherical lens (L3) is preferably disposed at a distance from the diffraction grating approximately equal to the focal length of the third spherical lens, wherein the third spherical lens is active in both the dispersion plane and the switching plane. An array of MEMS mirrors is preferably disposed at a distance from the third spherical lens approximately equal to the focal length of the third spherical lens.

The mirrors are preferably formed as a MEMS mirror array, wherein each mirror is preferably tiltable about an axis perpendicular to the switching plane and within the dispersion plane, wherein rotation of a selected mirror about its axis directs a selected wavelength component of an input signal to a selected output fiber port.

In the dispersion plane, an input optical signal of a first fiber port preferably enters free-space upon exiting a fiber optic cable, or waveguide, associated therewith, is magnified by the first and second spherical lenses, passes substantially unaltered through the first cylindrical lens, passes substantially unaltered through the second cylindrical lens, is focused by the third cylindrical lens, is angularly dispersed into constituent wavelength components by the diffraction grating, whereafter each constituent wavelength component is focused on an associated one of the plurality of mirrors by the third spherical lens.

In the switching plane, an input optical signal of a first fiber port preferably enters free-space upon exiting a fiber optic cable, or waveguide, associated therewith, is magnified by the first and second spherical lenses, is focused by the first cylindrical lens, passes substantially unaltered through the third cylindrical lens, is focused by the second cylindrical lens, is focused by the third cylindrical lens, passes unaltered through the diffraction grating, and is focused on an associated one of the plurality of mirrors by the third spherical lens. Each of the mirrors is selectively adjusted by tilting about the axis to cause the associated wavelength component to travel to a selected output fiber optic cable, or waveguide, thereby connecting the input fiber port and the output fiber port (for the associated wavelength component).

After reflection, in the switching plane, each wavelength component passes back through the third spherical lens, and being focused thereby, passing unaltered through the diffraction grating, being focused by the second cylindrical lens, passing substantially unaltered through the third cylindrical lens, and finally being focused on the output fiber port by the first cylindrical lens and by the first and second spherical lenses. In the dispersion plane, the selected wavelength component reflected from each mirror passes back through the third spherical lens, being focused thereby; passes back through the diffraction grating, where it is combined with the other selected wavelengths to form a single WDM beam; passes unaltered through the second cylindrical lens; passes through the third cylindrical lens being focused thereby; passes unaltered through the first cylindrical lens; and finally being focused on the output fiber port by the first and second spherical lenses before reaching the output fiber port.

Thus, the wavelength selective switch preferably comprises optical elements selected to optimize performance of the switch in two distinct planes, wherein the fiber port/free-space interfaces, the diffraction element, and the switching element are all disposed at focal points of the optics in both planes. Accordingly, each of the fiber port/free-space interfaces, the dispersive element, and the switching element are disposed at locations where the optical signal exhibits a Gaussian beam waist in both planes simultaneously.

The telescope preferably functions to reduce excessively large beam widths at the diffraction grating, thereby allowing a reduction in its size, and therefore the cost, of the diffraction grating. The telescope preferably further functions to alleviate design constraints for the first and second cylindrical lenses imposed by the need for narrow beam widths at the switching mirrors in the dispersion plane for achieving a desired spectral passband shape with smaller mirror dimensions, the need to limit beam widths at the switching mirrors in the switching plane for limiting the switching mirrors' height to width aspect ratios, and the need to reduce mirror tilt angles required for switching between fiber ports spaced a given distance apart.

Further, the wavelength selective switch comprises a plurality of fiber ports arranged in a fiber port array, a plurality of optical elements operable with each of the plurality of fiber ports, a dispersion element operable with each of the plurality of fiber ports to separate at least one optical signal into a plurality of wavelength components, and a switching element operable with each of the plurality of wavelength components and controllable to guide a selected one of the plurality of wavelength components to a selected one of the plurality of fiber ports, wherein each of at least one of the plurality of optical elements, the dispersion element, and the switching element affects an optical property of at least one optical signal in a first plane, and wherein each of said at least one of the plurality of optical elements, the dispersion element, and the switching element does not affect said optical property in a second plane, said first plane being generally orthogonal to said second plane.

Moreover, the wavelength selective switch still further comprises a means for modifying the size of the optical beam field in at least one of said two generally orthogonal planes, wherein the means provides an additional degree of design freedom by relaxing requirements on at least one of said plurality of optical elements, the dispersion element, the switching element, or the wavelength selective switch.

In an alternate embodiment, the wavelength selective switch may include a two-dimensional fiber port array and mirrors that can tilt on two axes, wherein multiplication of the fiber port count may be accomplished by selectively steering one or more wavelength components to one of a plurality of columns of fiber ports in the dispersion plane.

In still another alternate embodiment, the wavelength selective switch may include at least one two-dimensional fiber port array, at least one beam steering element, and mirrors that can tilt on two axes, wherein multiplication of the fiber port count may be accomplished by selectively steering one or more wavelength components to one of a plurality of columns of fiber ports in the dispersion plane.

Accordingly, a feature of the present WSS is its ability to independently select optical elements to optimize performance in one plane in which the optical element is active, without affecting the beam in the other plane. This simplifies design and allows greater flexibility.

Another feature of the present WSS is its ability to allow beams to overlap each other in the switching plane optical apertures of the various lenses. This allows for higher fiber port counts for one-dimensional fiber port arrays than previous wavelength selective switches, whose components must dedicate a portion of their optical aperture to each fiber port's beam, causing the components to grow unacceptably large as large numbers of fiber ports are added.

Another feature of the present WSS is its ability to utilize a simple fiber port array for interfacing fibers to free space.

Yet another feature of the present WSS is its ability to enable the same wavelengths from one or more optical signals to overlap one another in the WSS while sharing an optical aperture of the optical elements without cross talk occurring between the same wavelengths.

Yet another feature of the present WSS is its ability to increase fiber port count multiplicatively by expansion to two-dimensional fiber port arrays, and at lower cost, with better performance than other solutions.

Yet another feature of the present WSS is the fiber ports are "colorless", meaning that there is no limitation to which wavelengths can be switched to/from the fiber ports.

Yet another feature of the present WSS is its ability to have "hitless" switching, meaning that a wavelength can be switched to/from one port to another (i.e., an optical route can be established and/or changed) without affecting any other established optical routes, when the beam steering mechanism (e.g., a tiltable micro-mirror) has two axes of steering.

Yet another feature of the present WSS is the optical power loss of any established route can be increased in a controlled manner by purposely "detuning" the beam steering mechanism away from its setting that provides minimum optical loss. One use of this feature is to equalize the optical power levels of all routes at the output port (in N×1 operation) or ports (in 1×N operation).

Yet another feature of the present WSS is that a relatively high number of optical ports can be accommodated. For example, designs incorporating 42 ports (e.g., a 1×41 or 41×1 WSS) have been developed, although the practical upper limit of port count has not been established. Additionally, there is a variation of the present invention that allows for a multiplicative expansion (e.g., 2×, 3×, etc.) to the number of ports with minimal impact to the basic design.

Yet another feature of the present WSS is its ability to maintain a low anticipated insertion loss; for example, less than 5 dB.

Yet another feature of the present WSS is its ability to achieve optical performance parameters within established telecom industry-standard specifications (e.g., polarization-dependent loss (PDL), chromatic dispersion (CD), polarization mode dispersion (PMD), etc.).

These and other features of the WSS will become more apparent to one ordinarily skilled in the art from the following detailed description of the invention and claims when read in light of the accompanying drawings.

BRIEF DESCRIPTION OF THE DRAWINGS

The present WSS will be better understood by reading the detailed description of the invention with reference to the accompanying drawings, in which like reference numerals denote similar structure and refer to like elements throughout, and in which.

Figure 1:
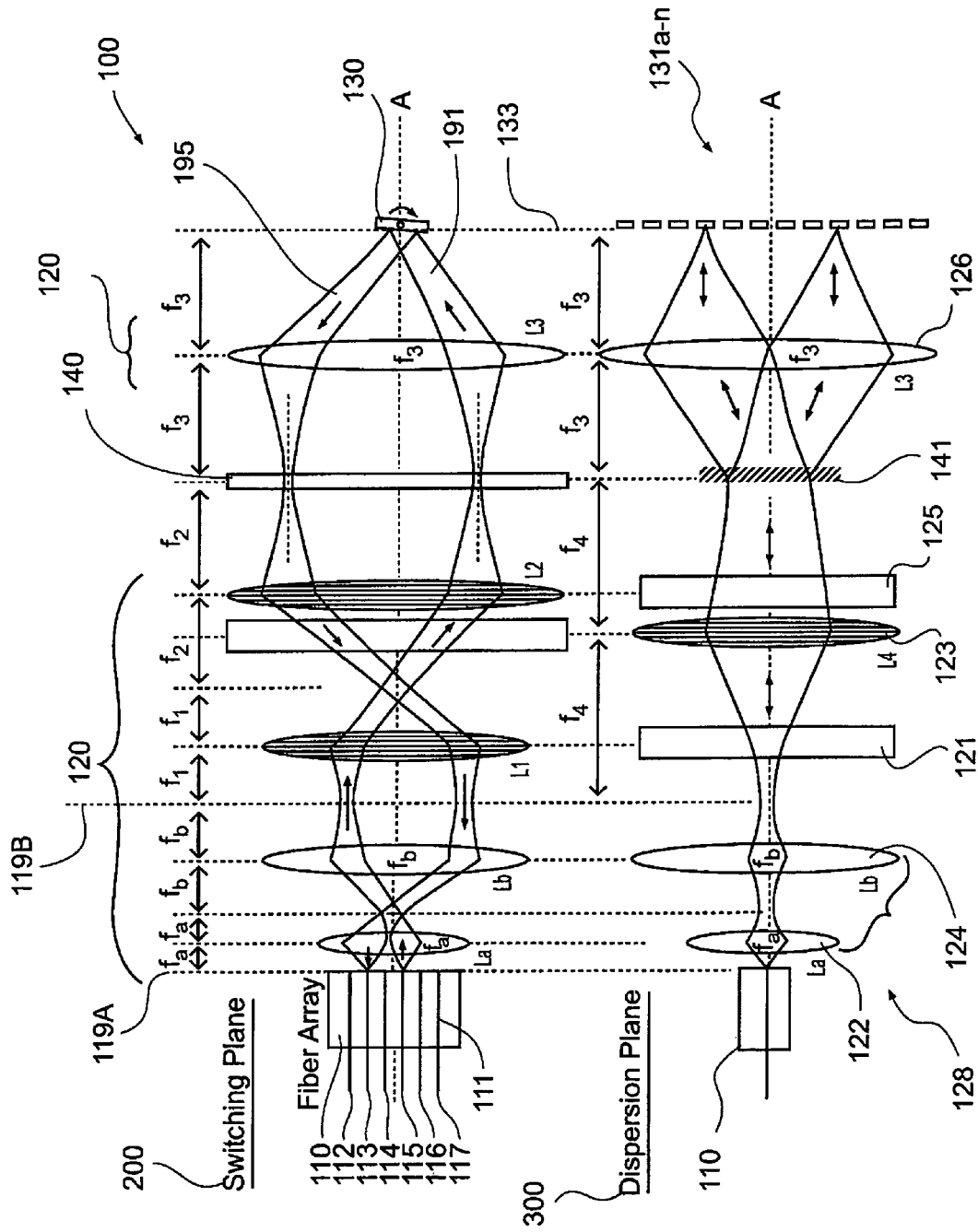
FIG. 1 is a plan view illustrating a Gaussian beam path in a switching plane of a wavelength selective switch according to a preferred embodiment, with an orthogonal view of the same components and light beams in the dispersion plane.

It is to be noted that the drawings presented are intended solely for the purpose of illustration and that they are, therefore, neither desired nor intended to limit the invention to any or all of the exact details of construction shown, except insofar as they may be deemed essential to the claimed invention.

DETAILED DESCRIPTION OF THE INVENTION

In describing the preferred embodiments of the present invention, as illustrated in the drawings, specific terminology is employed for the sake of clarity. The invention, however, is not intended to be limited to the specific terminology so selected, and it is to be understood that each specific element includes all technical equivalents that operate in a similar manner to accomplish a similar purpose.

For example, although the figures and description refer to single-element lenses, it should be understood that each such lens may be replaced by a plurality of elements, including one or more non-planar mirror(s), whereby the same function may be achieved. Such a plurality of elements may additionally offer enhanced performance characteristics. Moreover, such lens may be obtained by various techniques including but not limited to a single glass material, two or more glass materials in a compound fashion, a curved reflective surface, a diffractive surface, a holographic surface, or from combinations thereof. Similarly, while the term optical fiber will henceforth be used exclusively with reference to the means of conducting an optical signal to and from the fiber port array, it should be understood that any waveguide, or combination thereof may be implemented to provide an optical input signal to a free-space interface of the fiber port, and to receive an optical output signal therefrom. Furthermore, while the selective element is described as an array of tiltable switching mirrors, it will be understood that alternate selective elements may be used, including liquid crystal devices, two-dimensional mechanically deformable mirrors, or the like.

Referring to FIG. 1, wavelength selective switch for switching wavelengths from one or more optical signals, the signals comprising one or more optical wavelengths, each optical wavelength constituting a work piece (WSS) switch 100 employs a bimodal optical system, meaning that it has two distinctly different operational characteristics in orthogonal planes. A key and novel feature of switch 100 is that there is a very large design trade space afforded by the bimodal system that significantly improves the optical performance and fiber port capacity of switch 100 while simultaneously lowering the performance requirements of individual components. Moreover, the bimodal system enables independent selection of optical elements to optimize performance in one plane in which the optical element is active, without affecting the beam in the other plane, thus, simplifying design and allows greater design flexibility. The two optical planes provided by the bimodal optical system are uniquely optimized for the two basic processes that must take place in switch 100: 1) the separation and recombination (i.e., demultiplexing and multiplexing) of wavelengths in a wavelength-division multiplexing (WDM) signal, 2) the switching of light between fiber ports. The optical plane that performs the fiber port switching in the invention is referred to as the "switching plane" 200, and the optical plane that performs WDM multiplexing is referred to as the "dispersion plane" 300 since a diffraction grating is preferably employed in this plane to angularly disperse the WDM wavelength components. A feature of the switching plane is its ability to allow beams to overlap each other in the switching plane optical apertures of the various lenses and other optical elements of switch 100. This allows for higher fiber port counts for one-dimensional fiber port arrays than previous wavelength selective switches, whose components must dedicate a portion of their optical aperture to each fiber port's beam, causing the components to grow unacceptably large as large numbers of fiber ports are added.

In a preferred embodiment of switch 100, chosen for purposes of illustration, the optical system is shown in FIG. 1. It is contemplated herein that although simple single-element lenses are shown in FIG. 1 it is understood that in practice each lens may in fact be comprised of multiple elements, such as doublet and triplet lenses, in order to provide improved optical performance. In addition, it is further contemplated that the same functionality performed by optical lenses in FIG. 1 can be performed by non-planar mirrors. The top half of FIG. 1 illustrates the switching plane 200, the lower half the dispersion plane 300. Three lenses in FIG. 1, $L_1$, $L_2$, and $L_4$, are cylindrical lenses (denoted "cyl") and such lenses have optical "power" in one plane but appear as simple flat pieces of glass in the orthogonal plane. The other three lenses in FIG. 1, $L_a$, $L_b$, and $L_3$, are traditional spherical lenses (denoted "sph") and therefore appear identical in both planes.

Referring again to FIG. 1, switch 100 preferably comprises fiber port array 110, six lenses, three of which are spherical and three of which are cylindrical, comprises optics or optical elements 120, an array of tiltable switching mirrors comprises switching element 130, and a diffraction grating comprises dispersive element 140 (only "active" in the dispersion plane), wherein switching plane 200 and dispersion plane 300 are defined. As will be understood by those skilled in the art, switch 100 preferably further includes a baseplate, housing, mounting elements, adhesive, shock absorbing elements, mirror drive electronics, and the like, and as known in the art.

Figure 2:
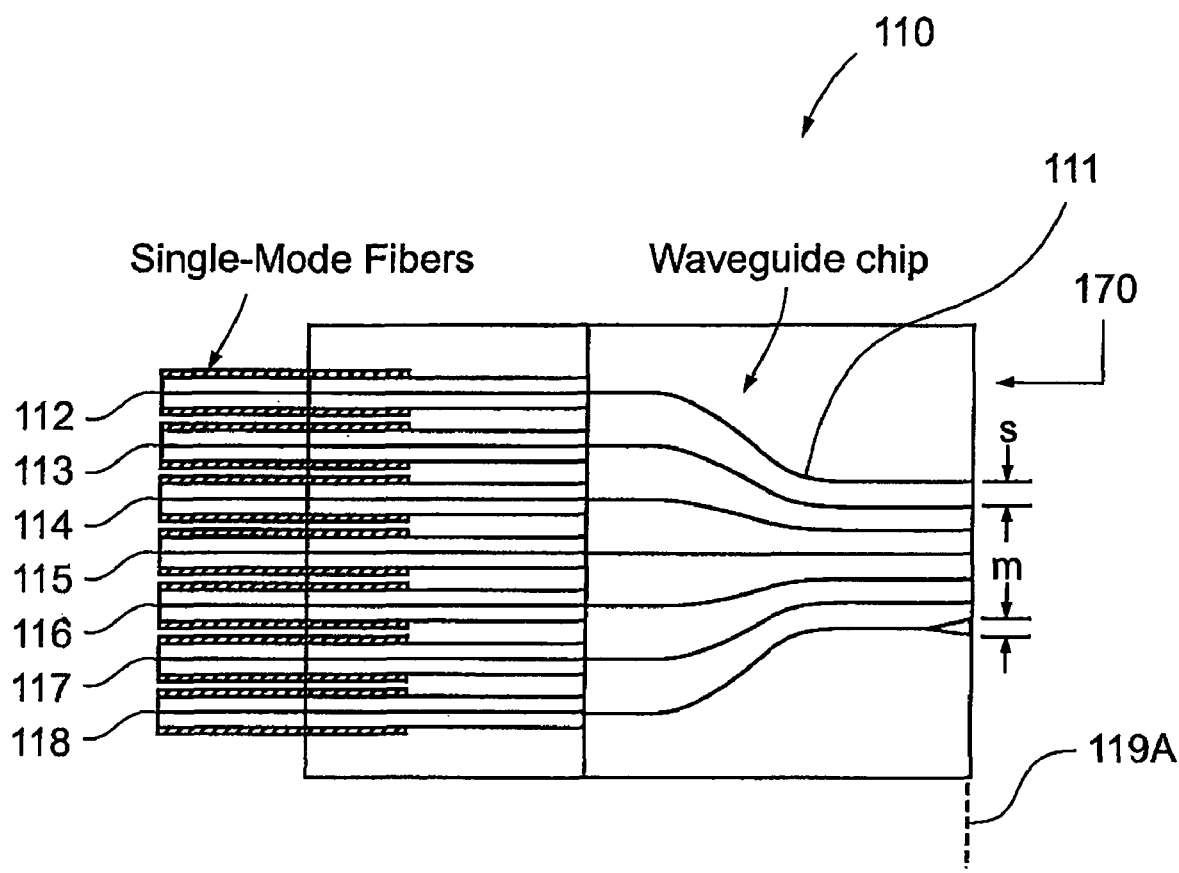
FIG. 2 is schematically illustrated optical concentrator array using planar waveguide included in the N×1 WSS of FIG. 1 according to a preferred embodiment.

Referring to FIG. 2, fiber port array 110 preferably includes waveguides 111 adapted to receive and secure optical fibers 112-118 in a selected position and/or orientation. In the switch illustrated in FIG. 1, each of optical fibers 112-117 is substantially aligned, defining a switching plane, and comprising a one-dimensional array. In FIG. 2, each of optical fibers 112-118 preferably comprises a termination point defining an interface with free-space, wherein optical signals propagating within an optical fiber and a waveguide 111 may exit the fiber and waveguide 111, and propagate through free-space. Optical fibers 112-118 preferably terminate at the edge of the fiber array radiate light containing WDM signals into free-space, which is then captured and manipulated by the various lenses of switch 100. Similarly, optical signals propagating in free-space that encounter the termination point, at least within a certain range of angular displacements, may enter into, and propagate within the optical fiber. Each such termination point is preferably aligned along line 119A within switching plane 200, i.e., disposed at locations where the optical signal exhibits a Gaussian beam waist in both planes simultaneously, for the purpose of but not limited to enabling a condensed core-to-core spacing represented by S and reduced mirror tilt angles required for switching between fiber ports spaced a given distance apart. It is contemplated herein that with regard to the fiber port array 110 that any mention of "fibers" is synonymous with "waveguides" since the fibers that comprise the optical ports of the system may be coupled (i.e., transitioned) to planar waveguides within the fiber array, as shown in FIG. 2 (note that only seven (7) fibers are illustrated for clarity and that N number of fibers is contemplated). As it may benefit switch 100, this fiber-to-waveguide transition preferably facilitates the condensation of the core-to-core spacing of waveguides 111 at the edge of the array represented by line 119A, and further to aid in the implementation of a large number of fibers in fiber port array 110. Preferably, in FIG. 2 the core-to-core spacing has been condensed to a value represented by S at the free-space edge of fiber port array 110. The light emitting from a fiber or waveguide in fiber port array 110 diverges immediately at the free-space edge along line 119A of the array; hence, there is a beam waist for each fiber at this edge. The width of the beam waist at this location is determined by the fundamental fiber mode. For typical singlemode fiber this beam waist is about 10.4 microns defined at the conventional $e^{-2}$ Gaussian profile points as shown in FIG. 4.

In the prior art typically a very small lens (i.e., a lenslet) is placed directly in front of every fiber in the fiber array, but this has the disadvantages of: 1) the optical quality of the tiny lenslets must be very high, 2) the alignment of each lenslet to its associated fiber is extremely critical, 3) the overall vertical height of the optics grows quickly in the switching plane 200 direction as the number of optical fibers 112-118 is increased, 4) the highly customized nature of a fiber/lens array results in a very limited number of commercial sources. The present WSS circumvents these problems by using a fully aperture-shared optical (FASO) system; in other words, every beam of light from every optical fiber 112-118 passes through every lens, mirror and grating aperture in switch 100, and occupies a significant portion of the total aperture, such that multiple beams can overlap one another on a given optical element. Preferably the fiber-to-fiber spacing in the fiber array can be condensed to 30 microns or less. This leads to a very compact optical system for switch 100 and relatively small tilt angles for a high port-count switch 100. The types of fiber port arrays 110 needed for operation of switch 100 are commonly available from a number of commercial sources. Also, the lenses required for operation of switch 100 are also easily obtained from many commercial sources. Therefore, an key feature of the WSS is that only the switching element 130 and dispersive element 140 are uniquely designed for switch 100, being the only customized components of switch 100.

Figure 3:
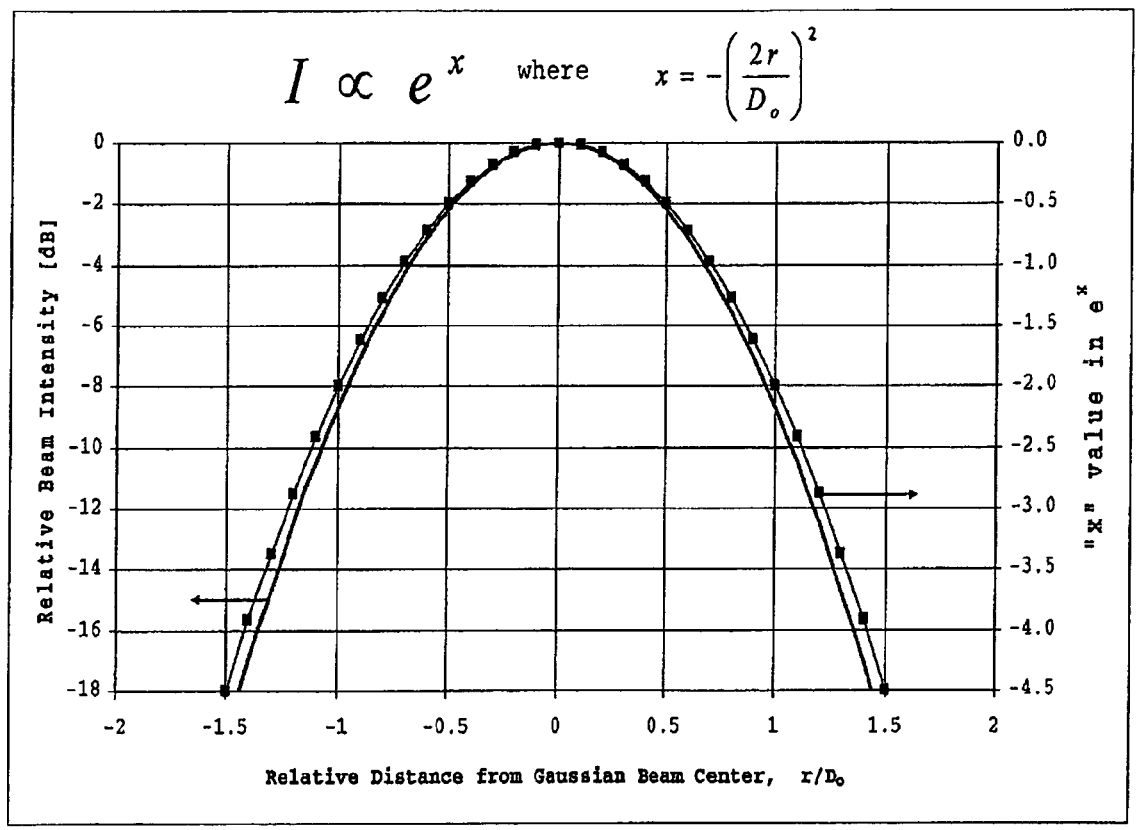
FIG. 3 is a diagram illustrating the relative beam intensity of a Gaussian beam in logarithmic units.
Figure 4:
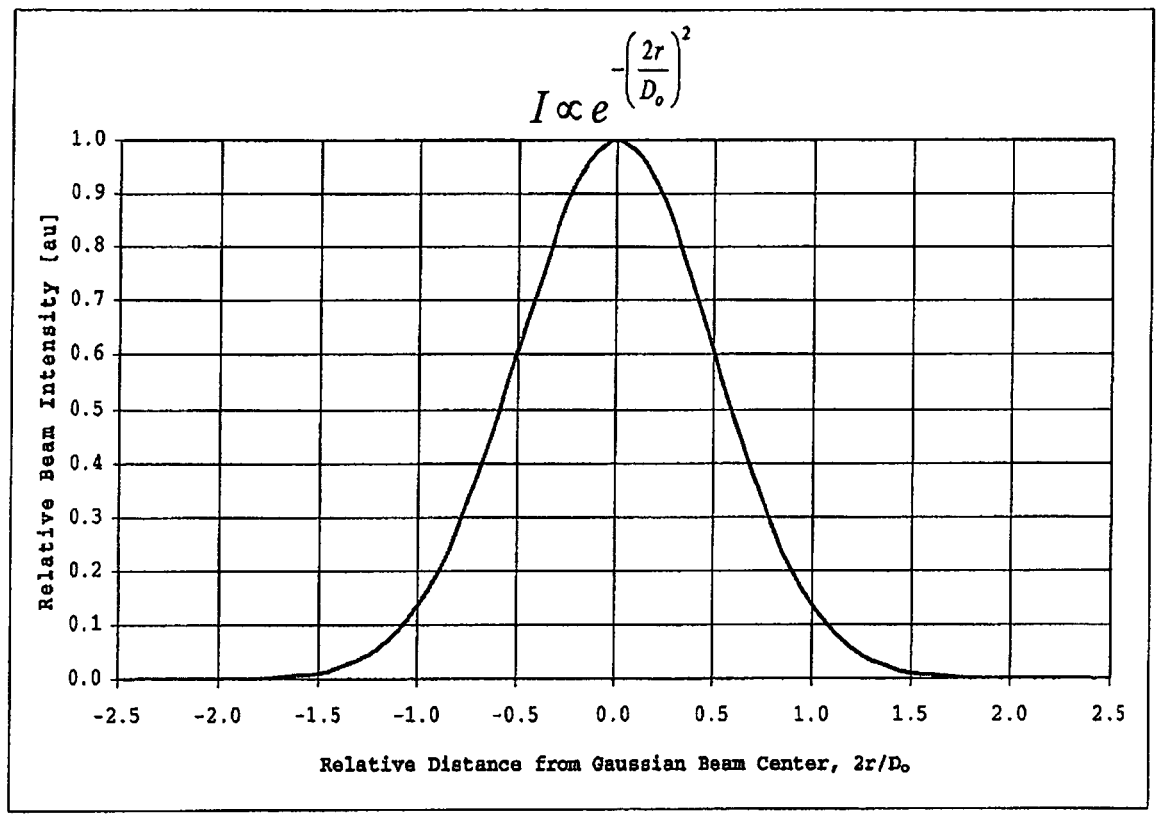
FIG. 4 is a diagram illustrating the relative beam intensity of a Gaussian beam of FIG. 3 in logarithmic units.

Referring now to FIGS. 3 and 4 switch 100 preferably takes full advantage of the fact that the light beam that emits from optical fibers 112-118 of fiber port array 110 has a predominately Gaussian intensity profile and therefore such light beam propagates in free-space according to well-established Gaussian propagation theory. The intensity profile of a Gaussian beam is illustrated in FIG. 3 (logarithmic units) and FIG. 4 (linear units). It is clear from FIG. 3 that there is no convenient "edge" in which to define the diameter of a Gaussian beam, and in fact it theoretically has a diameter that extends to infinity based on the proportion shown in FIG. 3. In practice, however, a Gaussian beam will be truncated (i.e., clipped) by some limiting aperture in an optical system. By convention the diameter of a Gaussian beam is often described as the width of the beam where the relative intensity has fallen to a value of 13.5% (−8.7 dB) of its peak, and is denoted herein by the symbol $D_o$ (see equations in FIGS. 3 and 4). This beam width is also commonly known as the $e^{-2}$ or $1/e^2$ beam width (see right-hand axis in FIG. 3).

Figure 5:
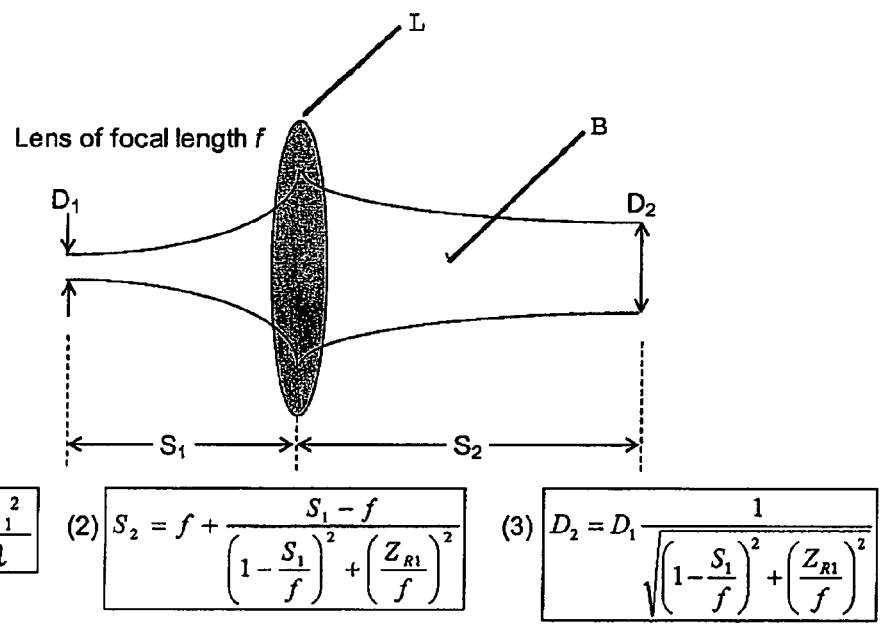
FIG. 5 is a schematic illustration and formulas representing the transformation of a Gaussian beam passing through a lens.

Referring now to FIG. 5 the transformation of a Gaussian beam B passing through a lens L is described by the relationships illustrated therein, where λ is the wavelength of light. Such relationship is further explained in S. A. Self, "*Focusing of Spherical Gaussian Beams,*" Applied Optics, vol. 22, pp. 658 (1983) and incorporated entirely herein by reference. An important result from Gaussian propagation theory is that points along the optical beam path of minimal beam diameter, called a "beam waist", can occur simultaneously at the front and back focal planes of a lens. In FIG. 5, Equation 2 gives the distance $S_2$ of the conjugate or output beam waist formed by a lens as a function of the input waist distance $S_1$ in front of the lens. From this equation, when the input beam waist is located at the front focal plane of the lens (i.e., $S_1$=f) then the output beam waist will be located at the back focal plane of the lens (i.e., $S_2$=f). This result will be referred to as the F-to-F rule, which enables optimization of WSS performance by control and modification of optical beam parameters and positioning of an optical element. However, the diameter of the two beam waists formed under the F-to-F rule are not generally equal as shown by Equation 3 in FIG. 5, except in the special case of $Z_{R1}$=f (Note: $Z_{R1}$ is defined by Equation 1 in FIG. 5).

Referring again to FIG. 1, optics 120 preferably comprises first cylindrical lens 121, third cylindrical lens 123, second cylindrical lens 125 and first spherical lens 122, second spherical lens 124, third spherical lens 126. Preferably, optical telescope lenses 128 comprise first spherical lens 122, and second spherical lens 124, are disposed between fiber port array 110 and the first cylindrical lens 121 and perform in a telescopic manner. It is contemplated herein that optical telescope lenses 128 may comprise one or more telescopic optical elements and such elements may perform a telescopic function. First spherical lens 122 is preferably disposed at a distance from fiber port array 110 free-space interface line 119A approximately equal to the focal length $f_a$ of first spherical lens 122. Second spherical lens 124 is preferably disposed at a distance from fiber port array 110 free-space interface line 119A approximately equal to the sum of the focal length $f_b$ of second spherical lens 124 and twice the focal length $f_a$ of first spherical lens 122. Moreover, second spherical lens 124 is preferably further disposed at a distance from first spherical lens 122 approximately equal to the sum of the focal length $f_b$ of second spherical lens 124 and the focal length $f_a$ of first spherical lens 122. Preferably, optical telescope lenses 128 are active in both the switching plane 200 and the dispersion plane 300. Optical telescope lenses 128 comprising first spherical lens 122 and second spherical lens 124 shown in FIG. 1, and labeled $L_a$ and $L_b$, essentially form a "telescope" in front of fiber port array 110. Although it is not necessary in an idealized system, optical telescope lenses 128 are a key feature that leads to the realization of relaxed specifications, performance requirements and/or reducing a design constraint of at least one of optics 120, dispersive element 140, and switching element 130 and for many of the other components in the optical system of switch 100.

The telescope lenses 128 preferably further function to alleviate design constraints for first spherical lens 122 and second spherical lens 124 imposed by the need for narrow beam widths at switching mirror array 131$a$-$n$ in the dispersion plane 300 for achieving a desired spectral passband shape with smaller mirror dimensions, the need to limit beam widths at switching element 130 in the switching plane 200 for limiting the switching mirrors' height to width aspect ratios, and the need to reduce mirror tilt angles required for switching between fiber ports 110-117 spaced a given distance apart.

First cylindrical lens 121 is preferably disposed at a distance from second spherical lens 124 approximately equal to the sum of the focal length $f_b$ of second spherical lens 124 and the focal length $f_1$ of first cylindrical lens 121. First cylindrical lens 121 is preferably active in switching plane 200 and passive in dispersion plane 300, i.e. first cylindrical lens focuses optical signals passing therethrough within switching plane 200, but has substantially no effect on optical signals passing therethrough in dispersion plane 300, as depicted by ray-tracings 191 and 195 in switching plane 200 verses dispersion plane 300. Third cylindrical lens 123 is preferably disposed at a distance from line 119B (positioned at the beam waist between second spherical lens 124 and first cylindrical lens 121) approximately equal to focal length $f_4$ of third cylindrical lens 123. Third cylindrical lens 123 is preferably active in dispersion plane 300 and passive in switching plane 200, i.e. third cylindrical lens focuses optical signals passing therethrough within dispersion plane 300. Second cylindrical lens 125 is preferably disposed at a distance from line 119B approximately equal to the sum of focal length $f_2$ thereof and twice focal length $f_1$ of first cylindrical lens 121. Moreover, second cylindrical lens 125 is preferably disposed at a distance from first cylindrical lens 121 approximately equal to the sum of the focal length $f_2$ of second cylindrical lens 125 and the focal length $f_1$ of first cylindrical lens 121. Second cylindrical lens 125 is preferably active in switching plane 200 and passive in dispersion plane 300, i.e. second cylindrical lens focuses optical signals passing therethrough within switching plane 200. Third spherical lens 126 is preferably disposed at a distance from second cylindrical lens 125 approximately equal to the sum of focal length $f_3$ of third spherical lens 126 and focal length $f_2$ of second cylindrical lens 125. Moreover, third spherical lens 126 is preferably disposed at a distance from third cylindrical lens 123 approximately equal to the sum of the focal length $f_4$ of third cylindrical lens 123 and the focal length $f_3$ of third spherical lens 126. Third spherical lens 126 is preferably active in both switching plane 200 and dispersion plane 300, i.e. the third spherical lens focuses optical signals passing therethrough within switching plane 200 and dispersion plane 300.

Preferably, optics 120 is a key design feature of switch 100 and based on the particular design and configuration of optics 120, such optics enables relaxed specifications, performance requirements and/or reduces a design constraint of dispersive element 140, switching element 130, and/or other optics 120. Moreover, it is contemplated herein that optics 120 may include one or more spherical and one or more cylindrical lenses and the like.

Although simple single-element lenses are shown in FIG. 1 for optics 120 it is contemplated herein that in practice each lens may in fact be comprised of multiple elements, such as doublet and triplet lenses, in order to provide improved optical performance of switch 100 and/or optics 120. Further, the shape of the lenses surfaces is not restricted to be purely spherical or cylindrical in shape, as the case may be, but may have a higher-order "aspheric" shape in order to improve optical performance of switch 100 and/or optics 120 as desired. Further, there is no restriction on the types of glass that the lenses are fabricated from which provides significant flexibility in optimizing the performance of each lens. Further, the optical performance of switch 100 and/or optics 120 preferably will benefit by having every lens surface coated with an anti-reflection coating to eliminate "ghost" reflections which may essentially become optical noise in switch 100. In addition, it is contemplated herein that the same functionality performed by optical lenses of optics 120 can often be performed by non-planar mirrors.

Switching element 130 is preferably formed as tiltable switching mirror array 131a-131n comprising N number of individually controllable mirrors, each mirror associated with a respective one of N number of wavelengths of an optical signal. Each mirror in switching mirror array 131a-131n is preferably tiltable about axis 133, which is preferably oriented perpendicular to switching plane 200 and within dispersion plane 300. Rotation of a selected mirror in switching mirror array 131a-131n about axis 133 may direct a corresponding wavelength component of an input signal to a selected output fiber port. Tiltable switching mirror array 131 is preferably disposed at a distance from third spherical lens 126 approximately equal to focal length $f_3$ thereof, aligned along line 133 within switching plane 200 and dispersion plane 300, i.e., disposed at locations where the optical signal exhibits a Gaussian beam waist in both planes simultaneously, for the purpose of but not limited to enabling condensed spacing between each mirror of switching mirror array 131a-131n, reduced mirror size, and reduced mirror tilt angles required for switching between fiber ports spaced a given distance apart.

Tiltable switching mirror array 131a-131n preferably is fabricated by the known semiconductor-based micro-electromechanical system (MEMS) technique, but switching element 130 is not restricted to use mirrors fabricated by such technique. Indeed, switching element 130 has the capability to efficiently use mirrors that are substantially larger than typical MEMS mirrors and therefore achievable by other traditional means of mechanical fabrication, perhaps at a significantly lower cost.

It is contemplated herein that tiltable switching mirror array 131 of switching element 130, which serves to steer the beams of light may be replaced by other beam steering mechanisms including, but not limited to, phased-array devices such 2-D pixilated mechanically deformable mirrors and liquid crystals (e.g., liquid-crystal-on-silicon, or LCOS). Herein, for convenience only tiltable MEMS mirrors are used for illustrating the operation of switching element 130 since the functionality of such mirrors within the optical system is known in the art.

Dispersive element 140 is preferably formed as diffraction grating 141 and is preferably disposed at a distance from line 119B approximately equal to the sum of twice focal length $f_1$ of first cylindrical lens 121 and twice focal length $f_2$ of second cylindrical lens 125. Diffraction grating 141 is additionally preferably disposed at a distance from line 119B approximately equal to twice focal length $f_4$ of third cylindrical lens 123. Moreover, diffraction grating 141 is preferably disposed at a distance from third cylindrical lens 123 approximately equal to focal length $f_4$ of third cylindrical lens 123 and/or diffraction grating 141 is preferably disposed at a distance from third spherical lens 126 of approximately equal to focal length $f_3$ of third spherical lens 126. Diffraction grating 141 is preferably active in dispersion plane 300 and passive in switching plane 200, wherein an optical signal emitted from one of optical fibers 112-117 propagating through free-space to diffraction grating 141 is preferably separated into N wavelength components. Moreover, diffraction grating 141 is disposed at a location where the optical signals exhibits a Gaussian beam waist in both planes simultaneously, for the purpose of but not limited to reducing excessively large beam widths at the diffraction grating, thereby allowing a reduction in its size, and therefore the cost, of the diffraction grating. In a preferred embodiment optical signals propagate in a substantially telecentric fashion in the active plane (dispersion plane) of the dispersive element as they ingress, and then egress, from the optical switching element.

As a convenience to illustrating the concepts of switch 100 all of the diagrams herein show the use of a transmissive-type of diffraction grating in a functional manner, but not in the true manner in which light is diffracted by such gratings. Equally applicable to switch 100 are reflective-type diffraction gratings.

Design Parameters

Figure 6:
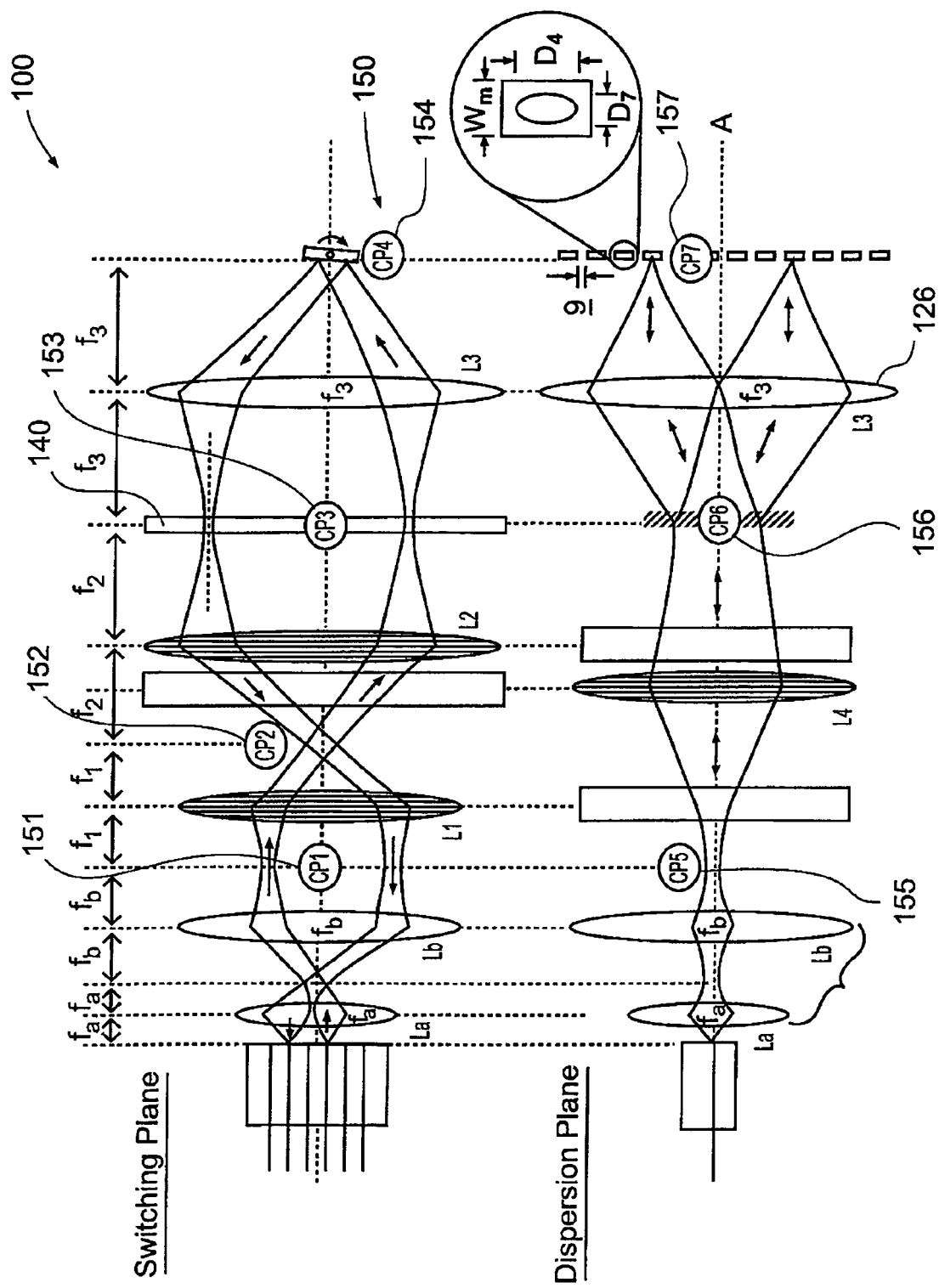
FIG. 6 is a schematic illustration of the beam check points of the wavelength selective switch of FIG. 1.

Referring now to FIG. 6 a further description of the optical functionality of switch 100 as shown in FIG. 1 is aided by defining several beam check points 150 as shown in FIG. 6. The beams at checkpoint 1 (CP1) 151 represent a magnified version of the end-face of the fiber array owing to two applications of the F-to-F rule; once through first spherical lens 122 ($L_a$) and once through second spherical lens 124 ($L_b$). The divergence angle (or cone angle) of the light beams at CP1 151 is reduced relative to the divergence angle of the light emitting from fiber port array 110 by the magnification factor of the telescope, denoted $M_T$, which is calculated from the ratio of the focal lengths of first spherical lens 122 to second spherical lens 124, or $M_T=f_b/f_a$, which enables optimization of WSS performance by control and/or modification of optical beam parameters and positioning of one or more optical elements.

Referring still to FIG. 6 it is contemplated herein that the F-to-F rule is preferably used consistently and advantageously in both bimodal planes throughout switch 100 in positioning optical components, dispersive element 140, and switching element 130 of switch 100. For example, the beams at CP2 152 represent the conjugate beam waists of CP1 151, the beams at CP3 153 represent the conjugate beam waists of CP2 152, and so on. As such, a beam waist is formed between every pair of lenses in the system and where dispersive element 140 and switching element 130 are positioned, as disclosed in FIG. 1. Preferably, in optical switch 100 switching element 130 is positioned at beam waists CP4 154 and CP7 157 in order to eliminate vignetting (clipping) and diffraction losses which are introduced by tiltable switching mirrors of switching element 130. Moreover, it is also preferred that after beam 191, 195 has propagated a full round trip through optical switch 100 and arrived back at fiber port array 110 that its beam waist should be substantially identical in size to the beam waist that originally emitted from a fiber or waveguide 111 so that the beam can be efficiently coupled back into a similar fiber or waveguide 111. A preferred objective in designing switch 100 is to design switch 100 with beam waists in both bimodal planes at switching element 130 in the switching plane 200 and at tiltable switching mirror array 131a-n in the dispersion plane 300 since this represents the halfway point in a roundtrip of switch 100. Therefore, adherence to the F-to-F rule, together with the use of lenses of sufficiently optical quality, insures that the end-to-end optical insertion loss of switch 100 will be minimized.

The beam paths through the bimodal switch 100 can be determined from traditional geometric optics, also called raytracing. Referring to switching plane 200 in the upper half of FIG. 6, raytracing reveals that the F-to-F rule preferably and advantageously produces beams that propagate parallel to the optical axis A (i.e., in a telecentric fashion) at CP3 153 where the dispersive element 140 is positioned. Such telecentricity is critical for efficient and proper operation of dispersive element 140; otherwise, the same wavelength λn from various fibers would not exactly overlay on the designated switching mirror of tiltable switching mirror array 131a-n associated with that wavelength λn. Raytracing through third spherical lens 126 ($L_3$) preferably reveals that all beams from every fiber in the fiber array of a particular wavelength λn will converge on the specific switching mirror of tiltable switching mirror array 131a-n associated with that wavelength λn. The controlled tilting of this switching mirror for wavelength λn will then create an optical path, or route, between two chosen fibers in fiber port array 110, which is equivalent to connecting two of the optical ports in switch 100 (on a per wavelength basis).

Referring to the dispersion plane 300 in the lower half of FIG. 6, raytracing reveals that every beam from every fiber travels in-line with the optical axis A until they reach the dispersive element 140 at CP6 156. Preferably, dispersive element 140 will angularly disperse the wavelength components of the WDM signal, and since dispersive element 140 is positioned precisely at the front focal plane of third spherical lens 126 ($L_3$) then the various wavelength λn components, after passing through third spherical lens 126 ($L_3$), will propagate parallel to each other (i.e., in a telecentric fashion) as they approach the switching mirrors of tiltable switching mirror array 131a-n positioned at CP7 157. This is advantageous to having switching mirrors fabricated on a planar substrate such that their nominal tilt angle in the dispersion plane is zero. In a perfect switch 100 the switching mirrors would therefore only need to tilt in the switching plane in order for switch 100 to function. Moreover, the design of switch 100 utilizing the F-to-F rule has simultaneously provided the desired telecentricity of the optical beams at CP7 157 and allowed for beam waists to occur at both CP6 156 and CP7 157. It is noted herein that diffraction grating 141 does not operate in the exact manner as shown in FIG. 1 and FIG. 6, but are functionally illustrated as shown for convenience of discussion. Details concerning the diffraction grating are discussed below.

It is noted that beam waists are coincident in both planes of switch 100 with the exception that there is not a beam waist in dispersion plane 300 associated with the beam waist located at CP2 152 in switching plane 200. It is also noted that all beam crossing locations in switching plane 200, other than at CP4 154 (switching mirrors of tiltable switching mirror array 131a-n), occur in free-space which significantly reduces the chance of scatter-induced optical crosstalk between fiber ports.

Preferably, third spherical lens 126 ($L_3$) simultaneously performs two very different functions: 1) creates convergent beams in switching plane 200, and 2) creates telecentric beams in dispersion plane 300. Preferably, it is desirable to start the design of switch 100 by defining dispersive element 140 and switching element 130 parameters early in the design process since these two components are the most unique and, especially in the case of switching element 130, requires customized components. For these reasons the properties of dispersive element 140 and switching element 130 preferably are allowed to dictate the optical requirements for third spherical lens 126 ($L_3$), which means that third spherical lens 126 ($L_3$) is primarily optimized for dispersion plane 300.

Referring now to the equation below, if $\Theta_{mn}$ represents the difference in dispersive element 140 angles between two adjacent wavelengths $\lambda_m$ and $\lambda_n$, and if $S_{mn}$ represents the switching mirror of tiltable switching mirror array 131a-n center-to-center spacing at the same wavelengths, then the required focal length of third spherical lens 126 ($L_3$) can be calculated from:

$$f_3 = \frac{S_{mn}}{2\tan\left(\frac{\theta_{mn}}{2}\right)}$$

At this point in the design of switch 100 all of the other lenses are free variables, meaning that their focal lengths can be selectively chosen to satisfy specific requirements of a WSS design for switch 100. A great deal of flexibility is afforded by the WSS in selecting telescope lenses 128, first spherical lens 122 ($L_a$) and second spherical lens 124 ($L_b$) in order to reduce the performance burden of individual components while also meeting other system-level performance requirements. Referring again to FIGS. 1 and 6 it is contemplated, however, that the focal lengths of lenses, first cylindrical lens 121 ($L_1$), third cylindrical lens 123 ($L_4$), and second cylindrical lens 125 ($L_2$) are not completely independent since the focal length of third cylindrical lens 123 ($L_4$) must equal the sum of one focal length $f_1$ of first cylindrical lens 121 ($L_1$), and one focal length $f_2$ of second cylindrical lens 125 ($L_2$), i.e., ($f_4=f_1+f_2$) [FIG. 1] so that beam waists will exist simultaneously at CP3 153 and CP6 156, which enables optimization of WSS performance by control and/or modification of optical beams and positioning of one or more optical elements.

A critical performance specification for a WSS is the spectral passband associated with each WDM wavelength channel. The passband directly relates to the size of the beam waist in dispersion plane 300 at switching mirror of tiltable switching mirror array 131a-n located at CP7 157. As a rule-of-thumb an adequately broad, flat-topped passband shape is provided for each WDM channel if the $e^{-2}$ beam width at switching mirror of tiltable switching mirror array 131a-n, denoted $D_7$, preferably is no larger than ¼ the width of the switching mirror, denoted $W_m$, or restated: $D_7 \leq W_m/4$. For example, preferably with a switching mirror $\lambda_n$ width of 100 microns $D_7$ should not be greater than 25 microns. The above rule-of-thumb assumes that the edge-to-edge gap g between adjacent switching mirrors is less than approximately 5% of the width of a mirror. The beam waist $D_7$ at CP7 157 preferably is the conjugate of the beam waist $D_6$ at CP6 156. Hence the beam width on a switching mirror of tiltable switching mirror array 131a-n, $D_7$, preferably can be made sufficiently narrow by making the beam waist $D_6$ at CP6 156 sufficiently wide.

The required beam width $D_6$ preferably can be calculated from Equation 3 in FIG. 5 using the previously calculated value for $f_4$. Advantageously the design of switch 100 allows for a relatively long focal length $f_4$ of third cylindrical lens 123 ($L_4$), which in turn helps produce a relatively large beam waist $D_6$ at CP6 156, according to Equation 3 in FIG. 5. However, there is a balance to be considered since an excessively wide beam waist $D_6$ at CP6 156 results in a larger and more expensive diffraction grating 141 than would otherwise be required by the system passband specifications. Preferably, the actual value of $f_4$ that is required to obtain the most efficient or desired $D_6$ at CP6 156 is dependent on the size of the beam waist $D_5$ at CP5 155, according to Equation 3 in FIG. 5, since $D_6$ is the conjugate beam waist of $D_5$. A key feature of the invention is that the beam waist $D_5$ at CP5 155 is selectable by the amount of optical magnification $M_T$ provided by optical telescope lenses 128 ($L_a$ and $L_b$). Therefore, the required value for $f_4$ is a function of the telescope magnification $M_T$. For practical WSS design, preferably the magnification provided by optical telescope lenses 128 ($L_a$ and $L_b$) telescope is critical for avoiding excessively large $D_6$ beam widths.

Turning attention now to switching plane 200 in the upper half of FIG. 6 it is observed that first cylindrical lens 121, and second cylindrical lens 125 ($L_1$ and $L_2$) effectively form another telescope. The reason for forming a telescope here preferably is to maintain beam telecentricity from CP1 151 to CP3 153 which, as discussed previously, allows third spherical lens 126 ($L_3$) to create convergent beams at switching mirror plane of switching element 130 of CP4 154. Preferably, the optical magnification of first cylindrical lens 121 and second cylindrical lens 125 ($L_1$ and $L_2$) telescope should be minimized for the purpose of reducing the amount of switching mirror tilt required for directing beams between fiber ports. Preferably, the magnification of this second telescope is minimized as $f_1$ is increased and $f_2$ is decreased. In addition, this in effect serves to reduce the optical aperture of second cylindrical lens 125 ($L_2$) and third spherical lens 126 ($L_3$) in switching plane 200. First cylindrical lens 121, and second cylindrical lens 125 ($L_1$ and $L_2$) are only operative in switching plane 200; hence their focal lengths $f_1$ and $f_2$ are variable to the extent that they satisfy the previously mentioned requirement that $f_4=f_1+f_2$, which enables optimization of WSS performance by control and/or modification of optical beam parameters and positioning of one or more optical elements.

However, another consideration in optimizing switch 100 is the height of the beam waist on the switching mirror of switching element 130 at CP4 154, denoted $D_4$. The fabrication and operation of the switching mirrors of switching element 130 preferably is aided by limiting the height of the mirrors to reasonable values; for example, switching element 130 generally benefits from a height to width aspect ratio of 10 or less. The beam diameter $D_4$ results from repeated applications of Equation 3 in FIG. 5 from CP1 151 to CP4 154. Therefore, to reduce the size of $D_4$ then the size of $D_3$ at CP3 153 preferably should be increased, which occurs when the size of $D_2$ at CP2 152 is decreased, which occurs when $f_1$ is decreased. However, decreasing $f_1$ for this purpose is in opposition to increasing $f_1$ to lower the magnification of first cylindrical lens 121, and second cylindrical lens 125 ($L_1$ and $L_2$) telescope as mentioned previously for reducing switching mirror tilt of switching element 130. Hence, the optimal value of $f_1$ for switch 100 preferably results from balancing switching mirror tilt angle against the height to width aspect ratio of the switching mirrors of switching element 130.

The general effects of varying the focal lengths of first cylindrical lens 121, and second cylindrical lens 125 (L1 and L2) are illustrated in Table 1. In this table 'SP' stands for switching plane 200, 'DP' stands for dispersion plane 300, and 'F/#' stands for the ratio of the focal length of a lens divided by its aperture width (It is noted herein that the higher the F/# the easier the lens is to design). There are 4 categories of effects: a check mark means beneficial, an 'X' mark means detrimental, an '~X' means mildly detrimental, and 'na' means no significant effect. Preferably, this table may be used as a general guide to improve particular performance parameters of switch 100 by varying the focal lengths of first cylindrical lens 121, and second cylindrical lens 125 (L1 and L2). However, it is contemplated herein that in optical design practice there are additional design parameters that may also be varied to achieve particular performance goals in switch 100, which enables optimization of WSS performance by control and/or modification of optical beam parameters and positioning of one or more optical elements.

TABLE 1

General parametric effects of varying the focal length of L1 and L2

| Parameter | effect of increasing focal length of L1 (f1) | effect of increasing focal length of L2 (f2) |
| --- | --- | --- |
| SP F/# of L1 | ✓ | na |
| SP F/# of L2 | ✓ | na |
| SP F/# of L3 | ✓ | X |
| DP F/# of L3 | ~X | X |
| DP F/# of L4 | na | na |
| channel passband shape | ✓ | ✓ |
| spot aspect ratio at MEMS | X | X |
| switching mirror height/width ratio | X | ✓ |
| switching mirror tilt angle | ✓ | X |
| DP width of grating | na | X |
| overall height of optics | ✓ | X |
| optical track length | na | X |

Above it was preferably noted that a smaller size of $D_2$ at CP2 152 is an aid to limiting the switching mirror aspect ratio. Preferably, $D_2$ can be made smaller if $D_1$ at CP1 151 is made larger, which is advantageously provided by telescope lenses 128 ($L_a$ and $L_b$). Moreover, in support of the earlier use of telescope lenses 128 ($L_a$ and $L_b$) to preferably provide magnification at CP5 155 in the dispersion plane 300 (note that since first spherical lens 122 ($L_a$) and second spherical lens 124 ($L_b$), ($L_a$ and $L_b$), are spherical lenses as shown in FIG. 6 then the beam properties at CP1 151 and CP5 155 are identical); hence telescope lenses 128 ($L_a$ and $L_b$) telescope preferably helps resolve issues in both the switching plane 200 and dispersion plane 300 simultaneously, and this is a key feature of the present WSS.

Figure 7:
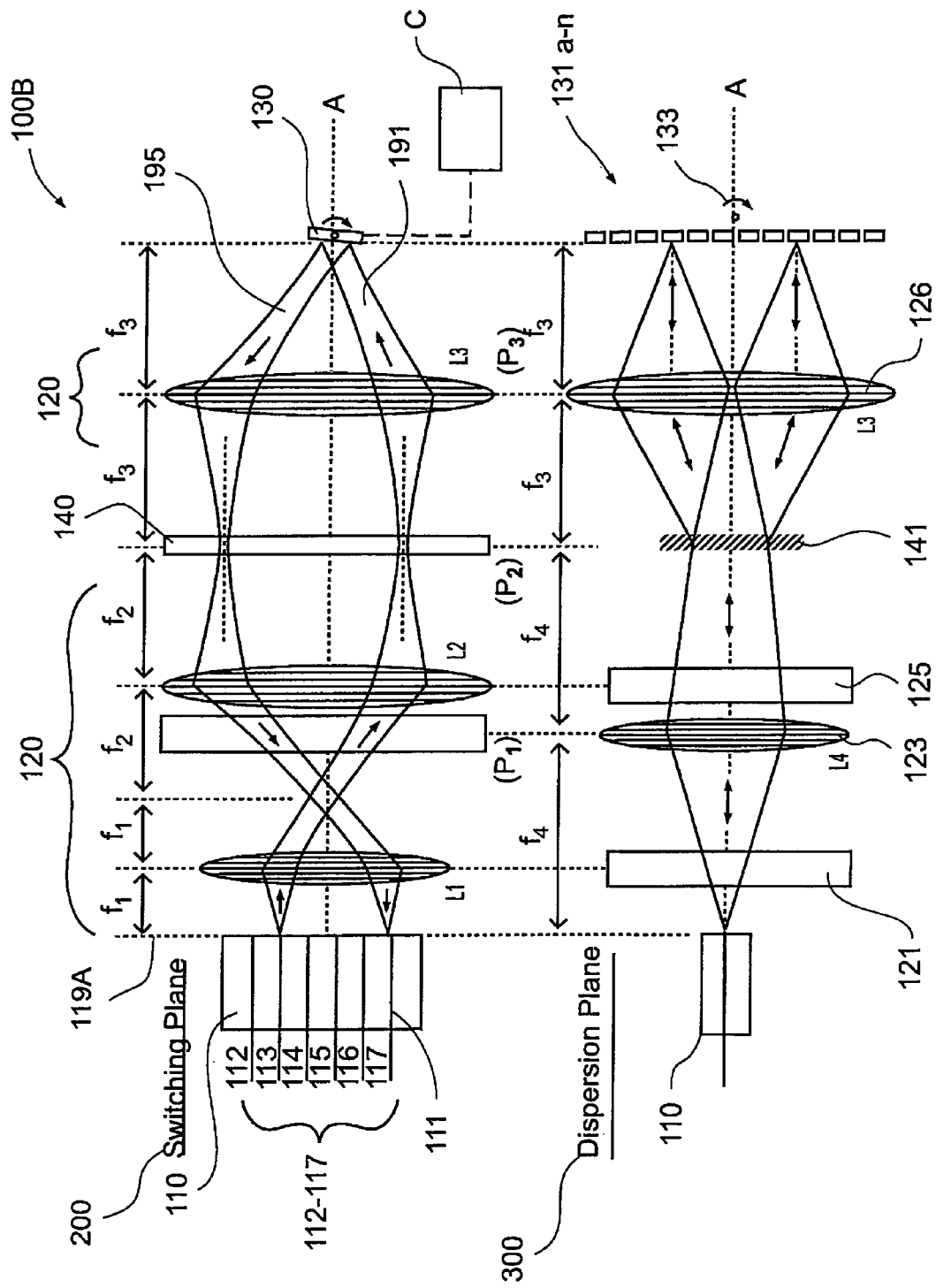
FIG. 7 is a schematic illustration of the wavelength selective switch of FIG. 1 without first and second telescoping lenses according to an alternate embodiment.

Referring to FIG. 7 an illustration of an alternate embodiment of the invention with the $L_a$ and $L_b$ telescope elements removed. This alternative embodiment of switch 100B preferably comprises port array 110, optics 120, switching element 130, and dispersive element 140, wherein switching plane 200 and dispersion plane 300 are defined. Port array 110 preferably includes fiber channel array 111 adapted to receive and secure optical fibers 112-117 in a selected position and/or orientation. In the switch illustrated in FIGS. 1-2, each of optical fibers 112-117 is substantially aligned within, and defining a switching plane 200, comprising a one-dimensional array. Each of optical fibers 112-117 preferably comprises a termination point defining an interface with free-space, wherein optical signals propagating within an optical fiber may exit the fiber and propagate through free-space. Similarly, optical signals propagating in free-space that encounter the termination point, at least within a certain range of angular displacements, may enter into, and propagate within the optical fiber. Each such termination point is preferably aligned along line 119A within switching plane 200.

Optics 120 preferably comprises first cylindrical lens 121, third cylindrical lens 123, second cylindrical lens 125 and third spherical lens 126. First cylindrical lens 121 is preferably disposed at a distance from line 119A approximately equal to the focal length $f_1$ of first cylindrical lens 121. First cylindrical lens 121 is preferably active in switching plane 200 and passive in dispersion plane 300, i.e. first cylindrical lens focuses optical signals passing therethrough within switching plane 200, but has substantially no effect of optical signals passing therethrough in dispersion plane 300, as depicted by ray-tracings 191 and 195 in switching plane 200. Third cylindrical lens 123 is preferably disposed at a distance from line 119A approximately equal to focal length $f_4$ of third cylindrical lens 123. Third cylindrical lens 123 is preferably active in dispersion plane 300 and passive in switching plane 200, i.e. third cylindrical lens focuses optical signals passing therethrough within dispersion plane 300. Second cylindrical lens 125 is preferably disposed at a distance from line 119A approximately equal to the sum of focal length $f_2$ thereof and twice focal length $f_1$ of first cylindrical lens 121. Second cylindrical lens 125 is preferably active in switching plane 200 and passive in dispersion plane 300, i.e. second cylindrical lens focuses optical signals passing therethrough within switching plane 200. First spherical lens 126 is preferably disposed at a distance from second cylindrical lens 125 approximately equal to the sum of focal length $f_2$ of second cylindrical lens 125 and focal length $f_3$ of first spherical lens 126. First spherical lens 126 is preferably active in both switching plane 200 and dispersion plane 300, i.e. first spherical lens focuses optical signals passing therethrough within switching plane 200 and dispersion plane 300.

Similar to FIG. 1, switching element 130 is preferably disposed at a distance from first spherical lens 126 approximately equal to focal length $f_3$, wherein rotation of a selected switching mirror of tiltable switching mirrors array 131a-n about axis 133 may direct a corresponding wavelength component of an input signal to a selected output port. Dispersive element 140, preferably formed as diffraction grating 141 is preferably disposed at a distance from line 119A approximately equal to the sum of twice focal length $f_1$ of first cylindrical lens 121 and twice focal length $f_2$ of second cylindrical lens 125, wherein an optical signal emitted from one of optical fibers 112-117 propagating through free-space to diffraction grating 141 is preferably separated into N wavelength components. Diffraction grating 141 is preferably active in dispersion plane 300 and passive in switching plane 200. In use, switch 100B may be used as a 1×5 switch, wherein a selected one of optical fibers 112-117, such as optical fiber 113, may be used as an input fiber port, and the remaining ones of optical fibers 112-117, i.e. optical fibers 112 and 114-117, may be used as output fiber ports. Accordingly, an optical signal propagating through optical fiber 113 may enter free-space at line 119A, preferably generally perpendicularly thereto, along axis A. As illustrated by ray-trace 191 and 195, the optical signal may propagate as a Gaussian beam, generally parallel to axis A, wherein the beam width expands as the beam propagates further from line 119A. In switching plane 200, first cylindrical lens 121 preferably focuses the beam with a focal point generally at position P1, but first cylindrical lens 121 preferably has substantially no effect on the beam in dispersion plane 300, wherein ray-tracing 191 illustrates continued growth of the beam width. The beam is then preferably focused in dispersion plane 300 by third cylindrical lens 123 with a focal point generally at position P2, but is substantially unaltered thereby in switching plane 200. The beam is then preferably focused by second cylindrical lens 125 in switching plane 200, whereafter the beam propagates generally parallel to axis A, and preferably remains substantially unaltered in dispersion plane 300 (i.e. the focusing of the beam at position P2 is preferably not disturbed by second cylindrical lens 125 in the dispersion plane 300). In dispersion plane 300, diffraction grating 141, disposed generally at position P2 as described above, preferably separates the beam into N wavelength components and, in conjunction with spherical lens 126, preferably focuses each wavelength component onto a face of a corresponding mirror of mirror array 131. In switching plane 200, however, diffraction grating 141 preferably has substantially no effect on the beam, which preferably continues to propagate generally parallel to axis A until each wavelength component is focused onto the face of the corresponding mirror of mirror array 131, generally at position P3.

After reflection by mirror array 131, wavelength components of the optical signal desired to be output on a selected optical fiber at fiber port array 110 are preferably focused by spherical lens 126 having a focal point generally at position P2 in switching plane 200, as well as in dispersion plane 300. Diffraction grating 141 preferably combines, for each optical fiber of fiber port array 110, the wavelength components selected for output thereon, if any in the dispersion plane 300. In switching plane 200, second cylindrical lens 125 and first cylindrical lens 121 preferably focus such combined wavelength components on the selected optical fiber generally at position 119A. In the illustration of FIG. 1, the wavelength component of the input optical signal from optical fiber 115 associated with the mirror has been selected for output on optical fiber 113, whereas in FIG. 7, the wavelength component of the input optical signal from optical fiber 113 associated with the mirror has been selected for output on optical fiber 117. In dispersion plane 300 of FIG. 1, third cylindrical lens 123 preferably focuses each wavelength component of the optical signal generally at position 119A, while in switching plane 200, first cylindrical lens 121 and second cylindrical lens 125 likewise focuses each wavelength component of the optical signal generally at position 119A.

Each of mirrors 131a-131n is preferably controlled by control device C operable to supply mirror control voltages therewith. As illustrated by ray-tracing 191, a tilt angle of a selected switching mirror of tiltable switching mirror array 131a-n, such as mirror 131n, will control onto which fiber port, if any, the associated wavelength component $\lambda_n$ will be output. Additionally, the tilt about axis 133 of one or more of mirrors 131a-131n may optionally be controlled such that a spot formed by an associated wavelength component on fiber port array 110 generally at position 119A may be off-center of the selected fiber port. The degree of tilt about axis 133 of mirror 131n may preferably control the signal strength of the output wavelength component, whereby equalization of signal strengths of different wavelength components may be accomplished, or whereby other selective adjustment of the output signal strength of any or all wavelength components may be adjusted.

It is important to note that the placement of each of lenses 121-127, diffraction grating 141, and mirror array 131 causes the beam to exhibit a beam waist (i.e. a local minimum value for beam width), in at least one of switching plane 200 and/or dispersion plane 300. Specifically, ray-tracing 191 and 195 preferably exhibits a beam waist generally at positions P1, P2, and P3, while ray-tracing 195 preferably exhibits a beam waist at positions P2, P1, and 119A. In switching plane 200, reduction of the beam width at position P1 preferably allows reduction of the beam width at position P2 in switching plane 200; in turn, the beam width at position P3 is reduced, whereby clipping and diffraction losses at mirror array 131 may be avoided. In dispersion plane 300, avoiding a beam waist at position P1 preferably allows the beam width at position P2 to be sufficiently large to achieve a narrow beam waist at position P3, whereby a desired spectral passband may be achieved with smaller dimension mirrors (which also facilitates achievement of a desired aspect ratio for the mirrors). Although the beam width at position P2 is relatively wide in dispersion plane 300, as discussed above, the beam nevertheless preferably exhibits a beam waist at position P2 in the switching plane 200, whereby a beam waist will also be exhibited at position P3, further reducing the beam width at position P3. Such reduction of the beam width in both switching plane 200 and dispersion plane 300 preferably reduces clipping or signal loss at the mirrors.

Figure 8:
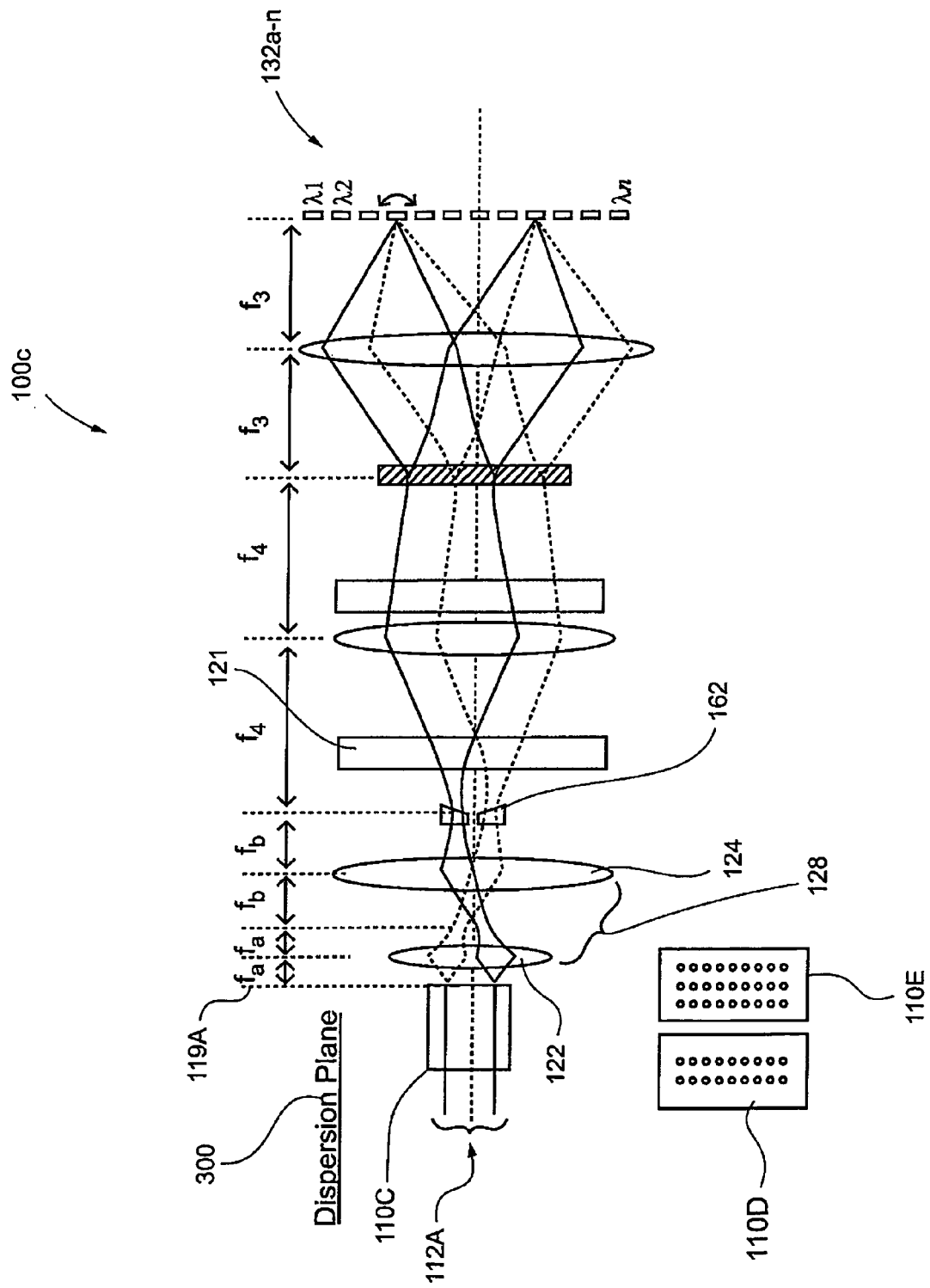
FIG. 8 is a schematic illustration of the wavelength selective switch of FIG. 1 with the addition of a beam steering element according to an alternate embodiment.

Referring now to FIG. 8 is an illustration of an alternate embodiment of the invention shown in FIG. 1 with the addition of beam steering element (BSE) 162 in the dispersion plane 300. A WSS with BSE has been disclosed in U.S. Provisional Application, filed Nov. 7, 2006, entitled a Segmented Prism Element and Associated Methods for Manifold Fiberoptic Switches, U.S. patent application filed Jun. 12, 2007, entitled Segmented Prism Element and Associated Methods for Manifold Fiberoptic Switches, U.S. patent application filed Oct. 18, 2007, entitled Beam Steering Element and Associated Methods for Manifold Fiberoptic Switches, U.S. patent application filed Oct. 25, 2007, entitled Beam Steering Element and Associated Methods for Manifold Fiberoptic Switches, U.S. patent application filed Oct. 30, 2007, entitled Beam Steering Element and Associated Methods for Manifold Fiberoptic Switches, are incorporated herein by reference in their entirety. This alternative embodiment of switch 100C preferably comprises the addition of beam steering element 162, to switch 100 of FIG. 1, preferably positioned between optical telescope lenses 128, (comprising first spherical lens 122 and second spherical lens 124) and first cylindrical lens 121 and operative in the dispersion plane 300 i.e. beam steering element steers optical signals passing therethrough within dispersion plane 300. Preferably, beam steering element 162 enables the number of optical fiber ports in switch 100C to be increased in a multiplicative fashion. Moreover, with the use of two dimensional fiber array 110c containing multiple columns of optical fibers 112A and with the addition of beam steering elements 162 after second spherical lens 124 of optical telescope lenses 128 ($L_a$ and $L_b$) the number of optical ports may be doubled or further increased as illustrated in FIG. 8, as with a 2-column fiber array 110D or 3-column fiber array 110E. Lastly, switch 100C preferably includes two-axis switching mirrors for tiltable switching mirror array 132a-n, which includes a first and second tilting axis enabling switching between columns in 2-column fiber array 110D or 3-column fiber array 110E. For example, a 1×41 WSS switch 100C may be expandable to a 1×83 WSS switch when utilizing fiber array 110D comprising two columns of fibers containing 42 fibers in each column. It is contemplated herein that architectures using three or more columns of fibers, employing three or more beam steering elements, to further increase the port count of switch 100C.

Referring again to FIG. 8 is an illustration of, yet another alternate embodiment of the invention shown in FIG. 1, which includes the addition of beam steering element (BSE) 162 in the switching plane 200. This alternative embodiment of switch 100C preferably comprises the addition of beam steering element 162, to switch 100 of FIG. 1, positioned between optical telescope lenses 128, (comprising first spherical lens 122 and second spherical lens 124) and first cylindrical lens 121 and operative in the switching plane 200 i.e. beam steering element steers optical signals passing therethrough within switching plane 200. Preferably, beam steering element 162 enables light from certain fiber ports to be directed to another set ($2^{nd}$ linear array of mirrors) of two-axis switching mirrors of tiltable switching mirror array 132a-n. This configuration of switch 100C essentially creates two independently operating WSS systems within the same optical system (switch 100C). The $2^{nd}$ WSS may be used for a number of purposes, including but not limited to, optical power monitoring of channels within the associated fiber ports.

It is contemplated herein that an ideal place to position beam steering element 162 is at CP3 153 or between separation element 140 and third spherical lens 126 ($L_3$) indicated in FIG. 6 where the beams from the various fiber ports have gained some physical separation.

It is still further contemplated that beam steering element (BSE) 162 may be positioned within switch 100 for the purpose of selecting beams from a portion of fiber array 110 to be directed to another set (one or more rows or columns of linear array of mirrors extending out of the page) of two-axis switching mirrors of tiltable switching mirror array 132a-n (an additional switching element 130).

It is still further contemplated herein that beam steering element (BSE) 162 of switch 100, which serves to steer the beams of light may be replaced by other beam steering mechanisms including, but not limited to, optical prisms, reflectors, diffractive elements, holographic elements, liquid crystals, liquid crystals on silicon, and combinations thereof in the art.

It is yet further contemplated herein that switching element 130 may comprise a dual axis mirror wherein a first axis is utilized for switching wavelengths or optical signals and a second axis is utilized to attenuate the power level of individual wavelengths or optical signals to obtain equal power levels. Such equalization and attenuation is set forth in United States patent application entitled "Variable Transmission Multi-Channel Optical Switch", issued on Sep. 28, 2004, having U.S. Pat. No. 6,798,941, which is incorporated herein by reference in its entirety.

Enhanced Diffraction Grating

It is still further contemplated that several features of the invention may be enhanced as the amount of wavelength dispersion by diffraction grating 141 is increased. There are several ways to accomplish increased wavelength dispersion. The simplest approach is to use a diffraction grating that has very high line density, usually expressed as the number of grooves per millimeter in the dispersion direction. However, the polarization dependence of the diffraction efficiency of gratings increases as the number of grooves/mm increases, and this places a practical limit on the selection of gratings used in this manner in order to maintain a sufficiently low polarization-dependent loss (PDL) for the overall optical system.

Figure 9:
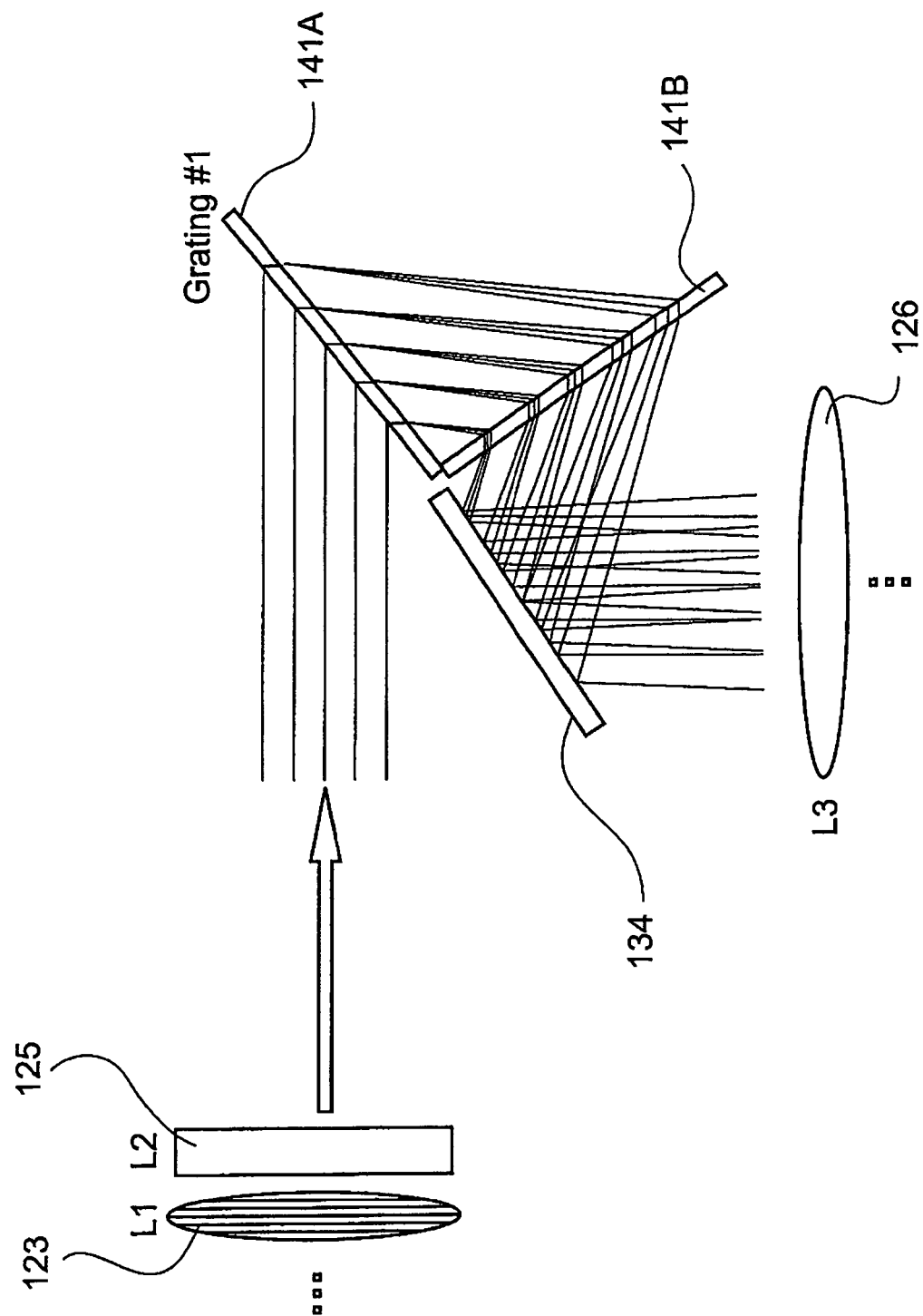
FIG. 9 is a schematic illustration of two serial transmissive dispersive elements according to an alternate embodiment.
Figure 10:
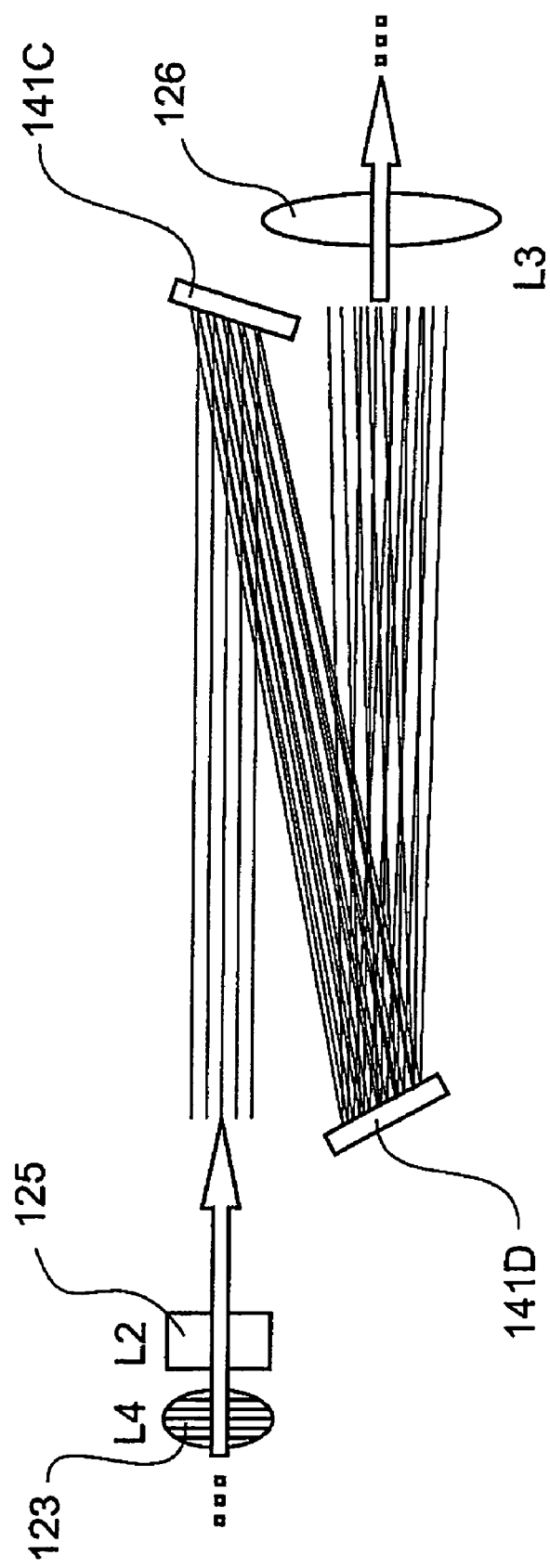
FIG. 10 is a schematic illustration of two serial reflective dispersive elements according to an alternate embodiment.
Figure 11:
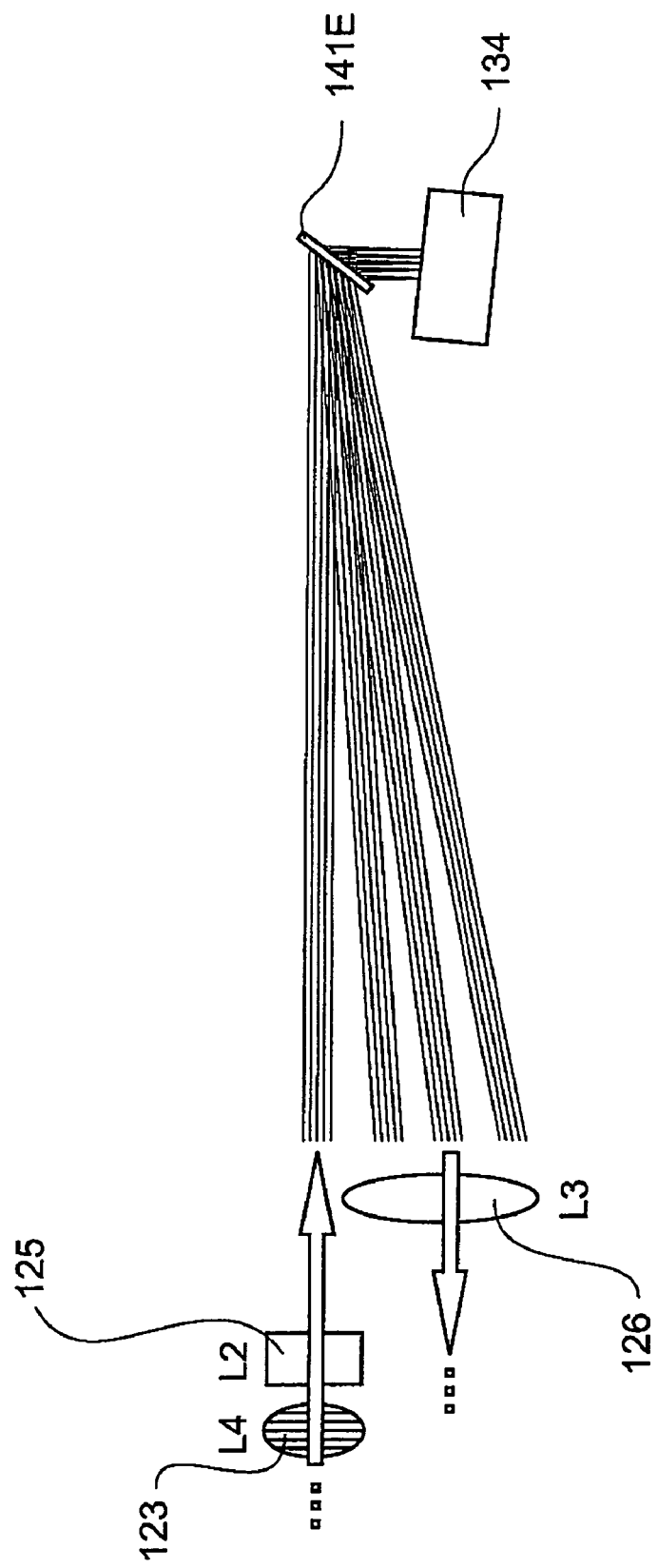
FIG. 11 is a schematic illustration of a single transmissive dispersive element with two passes through it according to an alternate embodiment.
Figure 12:
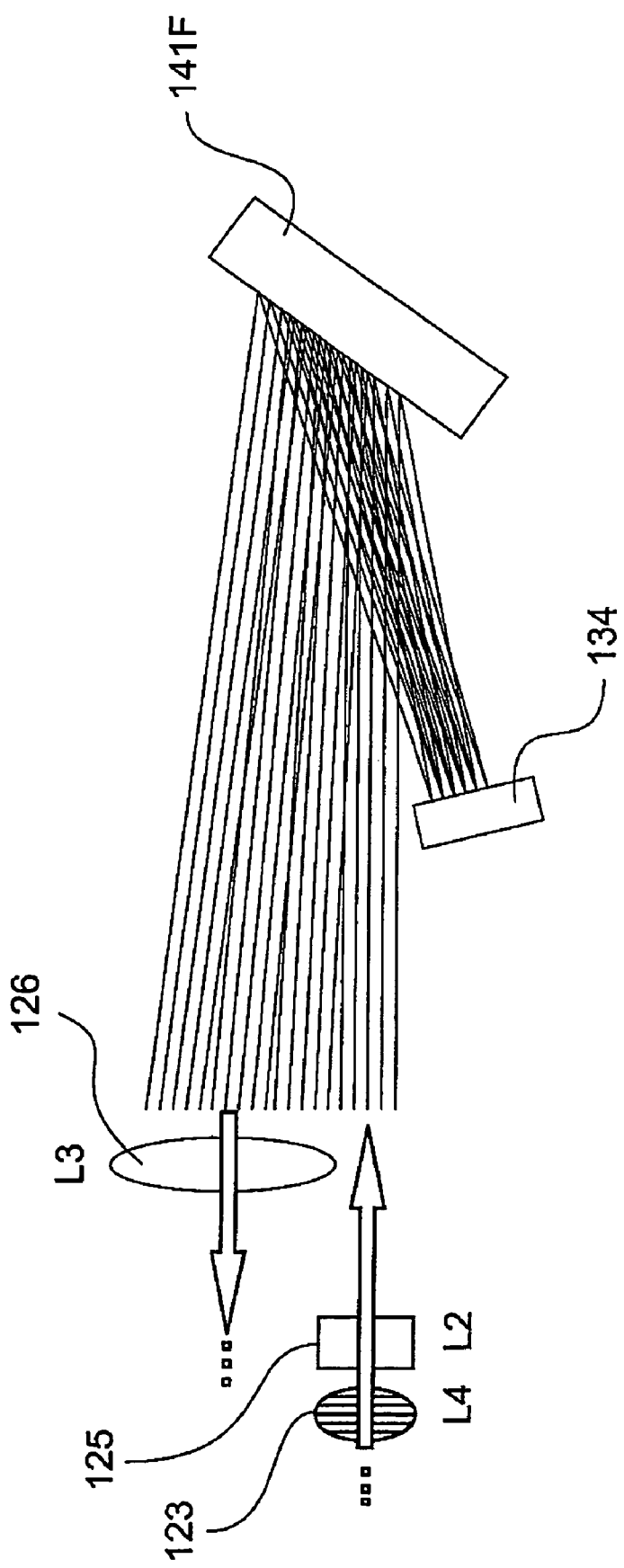
FIG. 12 is a schematic illustration of a single reflective dispersive element with two passes across it according to an alternate embodiment.
Figure 13:
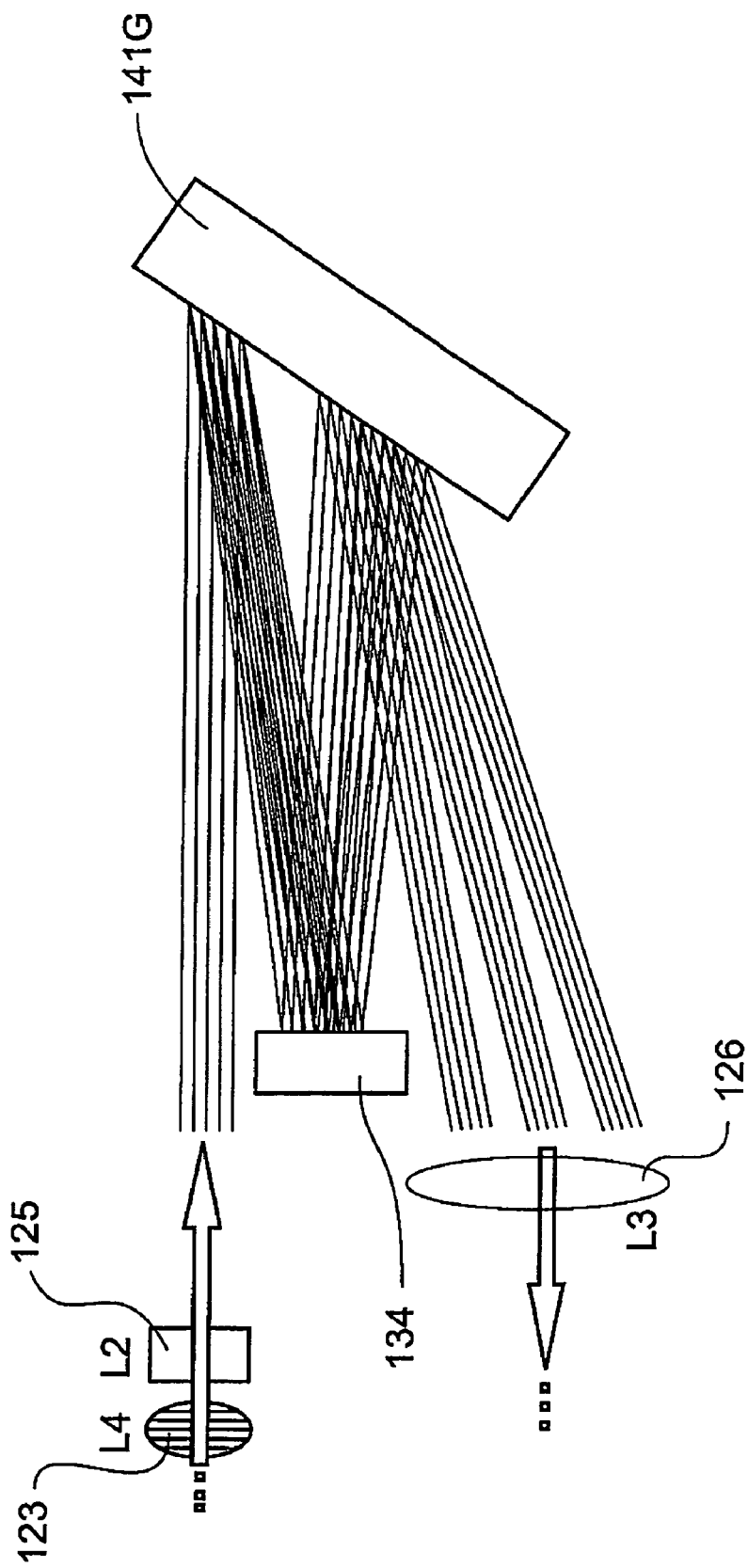
FIG. 13 is a schematic illustration of an alternative single reflective dispersive element with two passes across it according to an alternate embodiment.

Another approach to achieving increased wavelength dispersion is to utilize two or more diffraction gratings 141 in series. In this way diffraction gratings 141 having a lower grooves/mm density, but intrinsically lower PDL, can be combined while maintaining low total PDL. Referring now to FIG. 9 there is illustrated a section of switch 100 comprising two transmissive gratings 141A and 141B configured in a very compact arrangement and utilizing non-moveable turning mirror 134 between second cylindrical lens 125 and third spherical lens 126 that also reduces chromatic dispersion effects. Alternatively, the approach in FIG. 9 may also be implemented with two reflective gratings 141C and 141D positioned between second cylindrical lens 125 and third spherical lens 126 as shown in FIG. 10. Still further, it is contemplated herein that two passes through a single grating may be implemented as illustrated with transmissive grating 141E and turning mirror 134 positioned between second cylindrical lens 125 and third spherical lens 126 as shown in FIG. 11. Still further, it is contemplated herein that two passes over a single grating may be implemented as illustrated with reflective grating 141F and turning mirror 134 positioned between second cylindrical lens 125 and third spherical lens 126 as shown in FIG. 12. Still further, it is contemplated herein that two passes over a single grating may be implemented as illustrated with reflective grating 141G and turning mirror 134 positioned between second cylindrical lens 125 and third spherical lens 126 as shown in FIG. 13. It is contemplated herein that other variations to the basic approaches for the diffraction grating in switch 100 illustrated in FIGS. 9-13, could be configured utilizing two, three or more diffraction gratings.

Figure 14:
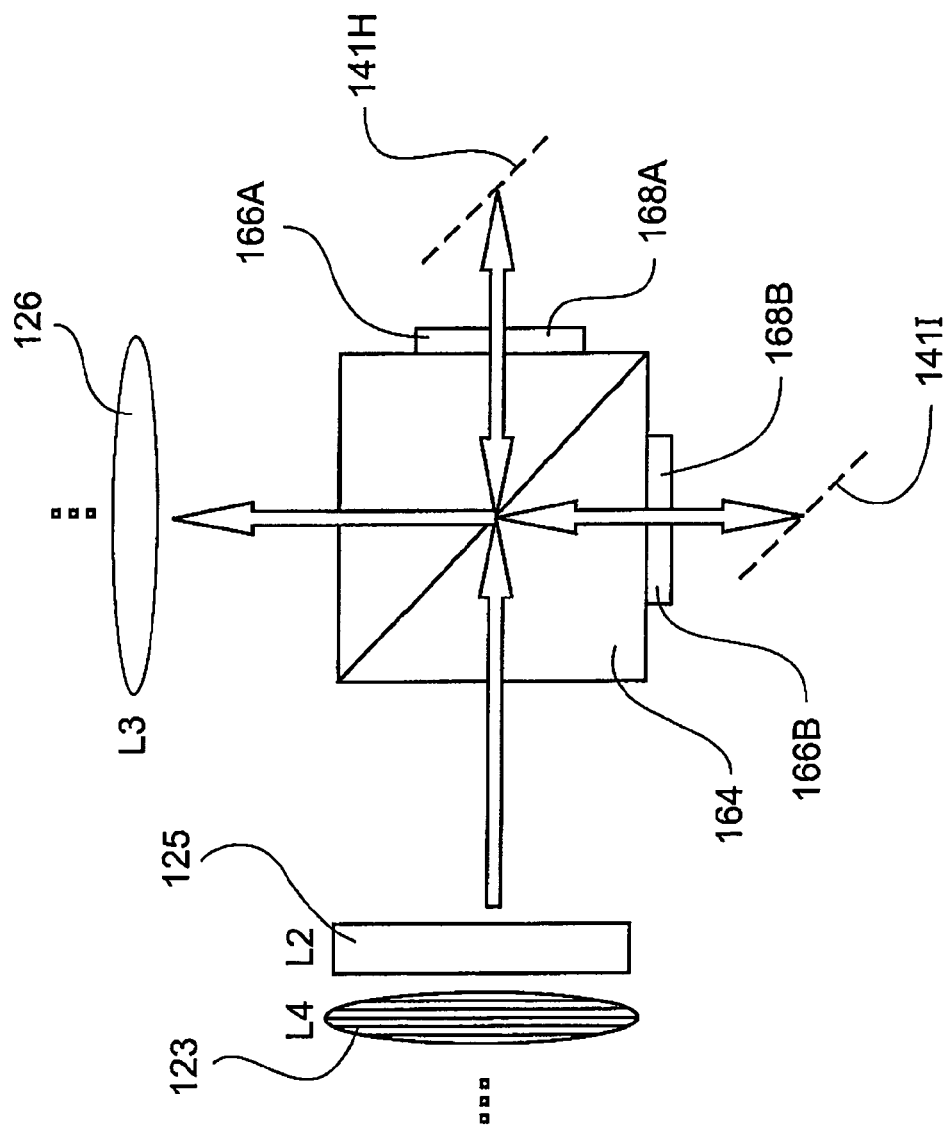
FIG. 14 is a schematic illustration of an alternative dual reflective dispersive element with polarization beam splitter centered there between according to an alternate embodiment.

Even when using lower-PDL gratings in the manner suggested by FIGS. 9-13 there may be further need to reduce the PDL of the overall switch 100 in order to reach the demanding specifications typical of today's telecom industry. Since the gratings are likely to be the dominant polarization-dependent component in switch 100 one may employ a technique set forth in FIG. 14 utilizing polarization beam splitter 164 in order to ensure that only circularly-polarized light is incident on gratings 141H and 141I. In FIG. 14 light (optical signal or beam) enters beam splitter 164 from the left and may have any arbitrary electric-field polarization state. The purpose of the beam splitting layer within the beam splitter is to decompose the incoming light beam of generally arbitrary polarization state into two orthogonal linearly-polarized states, one having an electric field oscillation in the plane of the page (labeled S-polarization) and the other having an electric field oscillation perpendicular to the plane of the page (labeled P-polarization). The splitting layer within beam splitter 164 may be designed to consistently reflect or transmit either one of these orthogonal linear polarization states. For the sake of discussion, the splitting layer of the beam splitter 164 has been designed to transmit light that is P-polarized and to reflect light that is S-polarized. As such, the decomposed P-polarized component of the incoming light beam is preferably transmitted by the splitting layer within the beam splitter 164 toward the quarter waveplate (QWP) 166A. The optical "fast" axis of QWP 166A will be oriented at a 45 degree angle relative to the P-polarization of the light and hence will produce a left-hand-circular (LHC) polarization state that strikes the grating 141H. Upon reflection from the grating 141H the polarization state of the light beam obtains a right-hand-circular (RHC) state. As this RHC-polarized beam enters back into QWP 166A it will be converted into an S-polarized state. Since in this discussion the splitting layer of the beam splitter 164 has been designed to reflect S-polarized light the beam will be reflected out of the beam splitter 164 and toward the lens 126. An analogous situation exists for the decomposed S-polarized component of the incoming light that is reflected by the beam splitting layer within the beam splitter 164 toward the QWP 166B. In this case the light that strikes grating 141I will have a RHC-polarization state. The diffraction gratings 141H and 141I have equal diffraction efficiencies for RHC-polarized and LHC-polarized light; hence, regardless of the amount of incoming light that is decomposed into either S- or P-polarization states the net amount of light that leaves the beam splitter 164 toward lens 126 will be the same independent of the polarization state of the incoming light. As such, any natural polarization-dependent diffraction efficiency properties of the gratings have been effectively removed.

Figure 15:
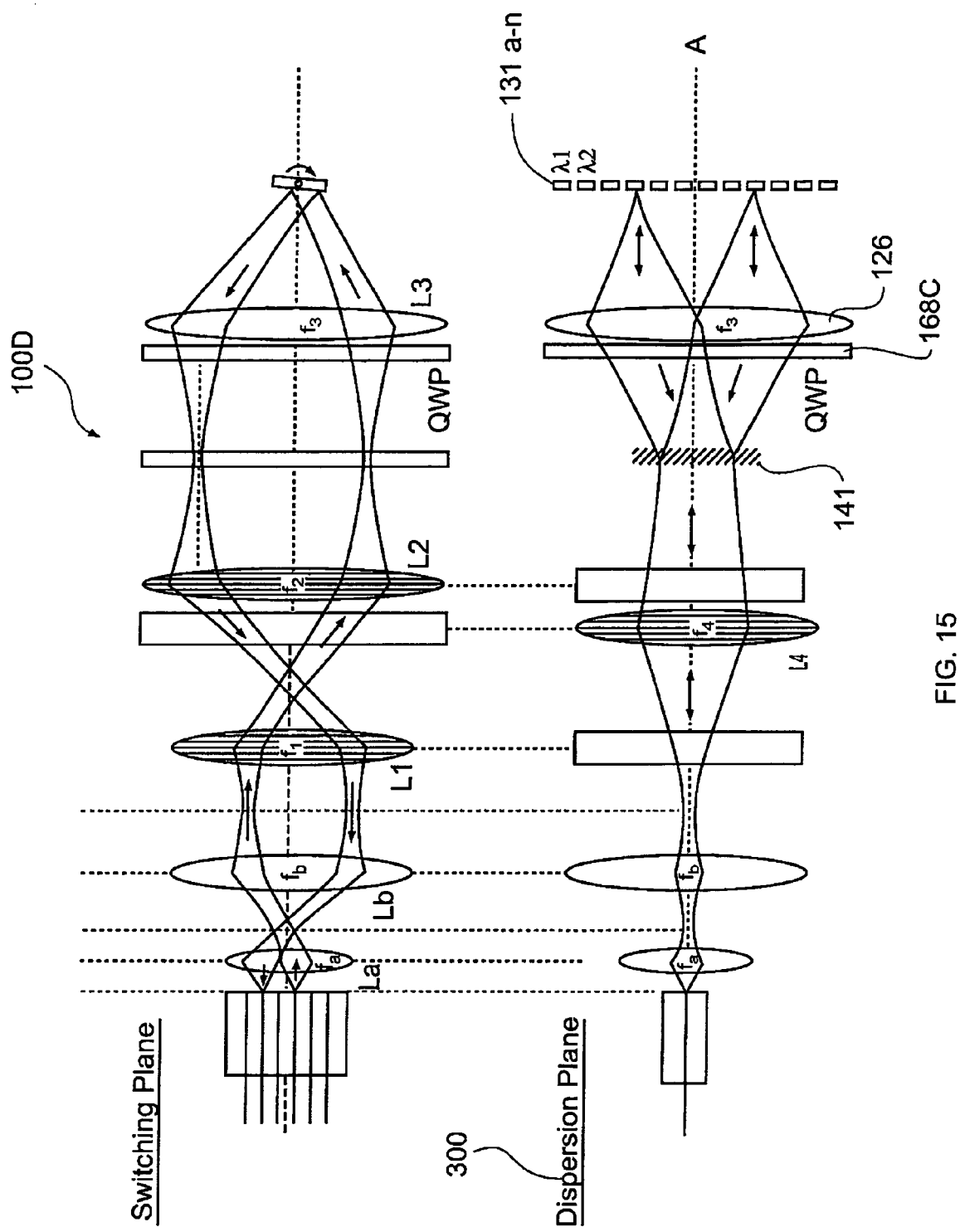
FIG. 15 is a schematic illustration of the wavelength selective switch of FIG. 1 having quarter wave plate inserted between the diffraction grating and third spherical lens according to an alternate embodiment.

Another relatively simple approach to reduce PDL is illustrated in FIG. 15, whereby quarter-waveplate 168C preferably is inserted in switch 100D (similar switch as illustrated in FIG. 1) between diffraction grating 141 and third spherical lens 126 just prior to the third spherical lens 126. The optical axis of quarter-waveplate 168C is preferably oriented at an angle of 45° with respect to dispersion plane 300 so that any plane-dependent polarization effects prior to third spherical lens 126 are negated. The location of quarter-waveplate 168C just prior to third spherical lens 126 is advantageous since: 1) the operation of a QWP has some sensitivity to the incident angle of light, and the angles of the beams are not excessive at this location, and 2) PDL can be increasingly mitigated as quarter-waveplate 168C is placed ever closer to tiltable switching mirror array 131. Hence, in particular applications it may be feasible to move the QWP closer to the mirror array in the form of a "cover glass" just above tiltable switching mirror array 131. It is contemplated herein to "deposit" or otherwise directly place a QWP directly on the surface of the switching mirrors of tiltable switching mirror array 131. Moreover, depending on the design of third spherical lens 126, quarter-waveplate 168C preferably may be incorporated as an integral component of third spherical lens 126. For example, quarter-waveplate 168C may be bonded to a plano surface of third spherical lens 126 or "sandwiched" between two halves of a doublet lens.

Additional design and performance flexibility may be afforded to switch 100 by expanding the optical beam or spot/beam cross section size (i.e., lateral beam width) in fiber port array 110. As an example, referring back to FIG. 2 illustrates optical beam expansion in switching plane 200 direction at free-space edge along line 119A of fiber port array 110, but the general concept is not solely limited to beam expansion in this plane. Beam expansion in switching plane 200 is preferably achieved during waveguide 111's fabrication processes by implementing a gradual widening of waveguide 111 at or near free-space edge along line 119A so the propagating beam remains in the state of a single Gaussian-like beam. It is noted that this beam expansion process is independent of the direction of light propagation at the free-space edge along line 119A of fiber port array 110. By way of illustration, optical beam expansion is accomplished in FIG. 2 by enlarging waveguides 111 to the width m.

Still further design and performance flexibility may be afforded to switch 100 by implementing anamorphic telescope lenses 128 ($L_a$ and $L_b$) in place of the standard telescope lenses 128 ($L_a$ and $L_b$) lenses illustrated in FIG. 1, which is operable in one of switching plane 200 or dispersion plane 300. Anamorphic telescope lenses preferably can be accomplished by making the surfaces of telescope lenses 128 ($L_a$ and $L_b$) non-spherical or by adding additional lenses to $L_a$ and $L_b$ telescope, etc. Anamorphic optical elements change, magnify or distort an optical property in one dimension, axis or plane but not another. A cylindrical lens is one example of an anamorphic optical element. Introducing such characteristics to switch 100 provides relaxation to the previous requirement that the focal length $f_4$ of third cylindrical lens 123 must equal the sum of the focal length ($f_1$) of first cylindrical lens 121 and the focal length ($f_2$) of second cylindrical lens 125 ($L_1$ and $L_2$), i.e., ($f_4 = f_1 + f_2$), which enables optimization of WSS performance by control and/or modification of optical beam parameters and positioning of one or more optical elements, and therefore enables even further independent optimization of switching plane 200 and dispersion plane 300.

After a beam of light (representing a particular wavelength $\lambda_n$ that entered through a particular fiber port; i.e., an optical signal) has made a full round trip though switch 100 and is about to be coupled back into a chosen output fiber (as selected by the angular position of the associated switching mirror $\lambda_n$ of tiltable switching mirror array 131) coupled to waveguides 111 of fiber port array 110, the efficiency of coupled light energy into the fiber may be selectively reduced by purposely detuning switching mirror $\lambda_n$ of tiltable switching mirror array 131 away from the angular position that produces maximum coupling efficiency. In effect, purposely detuning switching mirror $\lambda_n$ provides a means of actively controlling the insertion loss of every optical signal that is chosen to be coupled to an output fiber. Further, if a means external to switch 100 is provided for monitoring of the optical power levels of every optical signal in every output fiber then the aforementioned process of controlled insertion loss can be used to bring every optical signal to a common, or equalized, level of power. Said equalization of optical signals has several significant benefits in an optical network, so the ability to perform signal power equalization is a highly desirable feature of the invention. The degree of optical power coupling into a fiber may be analytically estimated by traditional "overlap integral" methods. Such analytical estimate is further explained in R. E. Wagner, W. J. Tomlinson, "*Coupling efficiency of optics in single-mode fiber components,*" Applied Optics, vol. 21, pp. 2671 (1982) and is incorporated herein by reference.

Referring again to FIG. 2, in the optical system of switch 100, angular detuning of a switching mirror $\lambda_n$ of tiltable switching mirror array 131 for the intentional purpose of de-optimizing the coupling efficiency, or equivalently generating excess insertion loss, results in the applicable beam of light moving laterally on end-face 170 of fiber port array 110 while the angle-of-incidence of the light on end-face 170 of fiber port array 110 remains essentially the same. For this specific scenario an approximate solution to the general coupling overlap integral has been disclosed by St-Amant, et al, in Y. St-Amant, D. Gariepy, D. Rancourt, "*Intrinsic properties of the optical coupling between axisymmetric Gaussian beams,*" Applied Optics, vol. 43, no. 30, pp. 5691 (2004) and incorporated herein by reference in its entirety.

Figure 16:
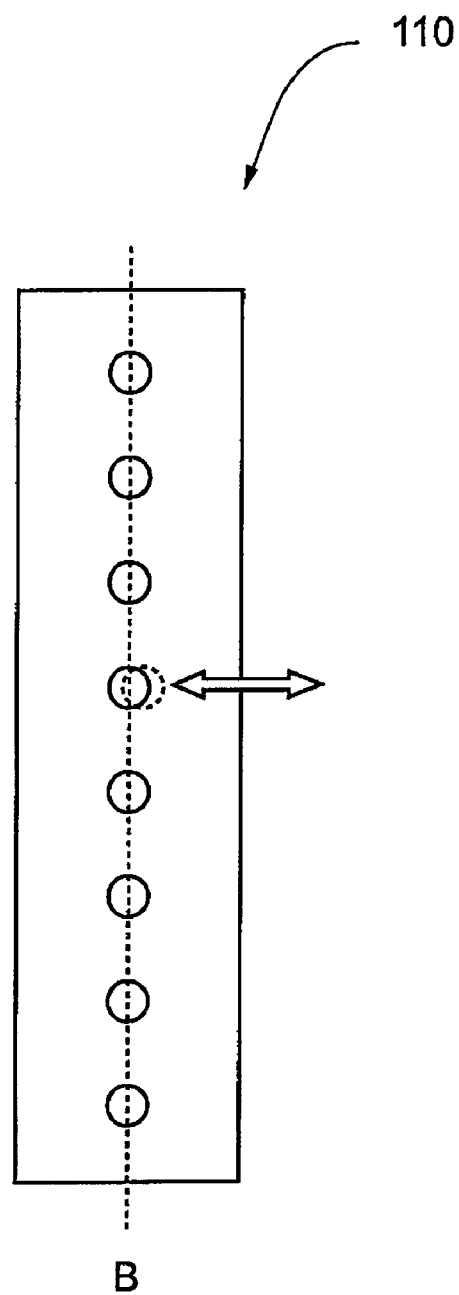
FIG. 16 is a schematic illustration of the end-face of the fiber port array of FIG. 1 according to an alternate embodiment.

For the design case of very closely spaced core-to-core separations s in fiber port array 110 it is preferably advantageous to move the beams orthogonal to the line of fibers B in order to prevent optical crosstalk to neighboring fibers, as illustrated in FIG. 16.

It should be recognized that the various design parameters set forth herein, enable optimization of WSS performance by control and/or modification of optical beam parameters, positioning of one or more optical elements, and magnifying an optical signal, in an optical switch to enable optimal performance of such optical switch, reducing design constraints, and providing an additional degree of design freedom by relaxing performance requirements, relaxed specifications, and/or reducing a design constraint of at least one of dispersive element 140, switching element 130, or other optics 120 in the optical system of switch 100.

It should further be recognized that the various design parameters set forth herein, including positioning of optical elements, dispersive element 140, switching element 130 and/or other optics 120 proximate the beam waist(s) and/or focal point(s) of optical elements within switch 100 both preserves the Gaussian shape of the optical beams throughout the optical switch 100 and reduces the overall optical path length for each optical signal and/or wavelength within switch 100.

The use of 'a' or 'an' in the following claims is to be interpreted as—does not require more than one but it permits more than one. In addition the use of "array" herein includes one and more than one row.

Having thus described exemplary embodiments of the present invention, it should be noted by those skilled in the art that the within disclosures are exemplary only, and that various other alternatives, adaptations, and modifications may be made within the scope of the present invention. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is at least:

1. A wavelength selective switch for switching wavelengths from one or more optical signals, the signal comprising one or more optical wavelengths, each constituting a work piece, the wavelength selective switch comprising:
   a plurality of fiber ports arranged in a fiber port array;
   a dispersive element operable with said plurality of fiber ports to separate at least one optical signal into a plurality of wavelength components;
   a plurality of optical elements operable with said plurality of fiber ports, wherein said plurality of optical elements further comprises at least three cylindrical lenses positioned in front of said dispersive element, wherein at least two of said at least three cylindrical lenses has power in a switching plane and at least one other of said at least three cylindrical lenses has power in a dispersive plane;
   said plurality of optical elements further comprises at least one spherical lens positioned in back of said dispersive element, wherein said at least one spherical lens has power in both said switching plane and said dispersive plane; and
   a switching element operable with the plurality of wavelength components and controllable to guide a selected one of the plurality of wavelength components to a selected one of said plurality of fiber ports,
   wherein said at least two of said at least three cylindrical lenses, said at least one spherical lens, and said switching element affects an optical properly of at least one optical signal in said switching plane, and wherein said at least one other of said at least three cylindrical lenses, said at least one spherical lens, and said dispersive element affects an optical properly of said at least one optical signal in said dispersive plane, said switching plane being generally orthogonal to said dispersive plane.

2. The wavelength selective switch of claim 1, wherein said at least one of said plurality of optical elements, said dispersive element, and said switching element affects a different optical property in said dispersive plane.

3. The wavelength selective switch of claim 1, further comprising means for independently magnifying the one or more optical signals in said switching and dispersive planes, wherein such magnification in said switching and dispersive planes enables optimization of performance of an element selected from the group consisting of at least one of said plurality of optical elements, said dispersive element, and said switching element in at least one of said switching and dispersive planes.

4. The wavelength selective switch of claim 1, further comprising means for independently magnifying the one or more optical signals in said switching and dispersive planes, wherein such magnification in said switching and dispersive plane reduces the total size of said wavelength selective switch.

5. The wavelength selective switch of claim 1, wherein said fiber port array further comprises means for modifying the size of an optical beam in at least one of said switching and dispersive planes, wherein said means for modifying provides an additional degree of design freedom by relaxing a performance requirement of at least one element selected from the group consisting of said plurality of optical elements, said dispersive element, and said switching element.

6. The wavelength selective switch of claim 1, further comprising means for positioning at least one of said plurality of optical elements, said dispersive element, said switching element in one of said switching and dispersive planes, wherein said means for positioning reduces a design constraint by relaxing performance requirement of an element selected from the group consisting of at least one of said plurality of optical elements, said dispersive element, and said switching element.

7. The wavelength selective switch of claim 6, further comprising means for positioning at least one of said dispersive element, said switching element, and said fiber port array proximate a location corresponding to at least one focal point of at least one of said plurality of optical elements in at least one of said switching and dispersive planes.

8. The wavelength selective switch of claim 1, further comprising at least one optical element, performing in a telescopic manner, disposed between said fiber port array and said dispersive element.

9. The wavelength selective switch of claim 8, wherein said at least one optical element, performing in a telescopic manner reduces a design constraint of at least one of said plurality of optical elements, said dispersive element, and said switching element.

10. The wavelength selective switch of claim 8, wherein said at least one optical element, performing in a telescopic manner increases a beam size of the optical signal proximate said dispersive element, thereby reducing a design constraint of said dispersive element.

11. The wavelength selective switch of claim 8, wherein said at least one optical element, performing in a telescopic manner operates on the one or more optical signals in each of said switching and dispersive planes.

12. The wavelength selective switch of claim 1, wherein said at least one of said plurality of optical elements, said dispersive element, or said switching element operates on the one or more optical signals in one of said switching and dispersive planes and substantially passive in the other plane.

13. The wavelength selective switch of claim 12, wherein said at least one of said plurality of optical elements, said dispersive element, or said switching element performs in an anamorphic manner.

14. The wavelength selective switch of claim 1, wherein said dispersive element, said switching element, and said fiber port array are disposed proximate a local beam waist of the one or more optical signals, thereby reducing a design constraint of at least one of said plurality of optical elements, said dispersive element, and said switching element.

15. The wavelength selective switch of claim 1, wherein the one or more optical signals propagates generally parallel to an optical axis in a telecentric fashion proximate said dispersive element in one of said switching and dispersive planes.

16. The wavelength selective switch of claim 1, wherein the one or more optical signals propagates generally parallel to an optical axis in a telecentric fashion between said dispersive element and said switching element in one of said switching and dispersive planes.

17. The wavelength selective switch of claim 1, further comprising at least one other spherical lens positioned in front of said dispersive element, wherein said at least one other spherical lens comprises a first, and a second spherical lens and wherein said at least three cylindrical lenses comprises a first, a second and a third cylindrical lens.

18. The wavelength selective switch of claim 17, wherein said first, said second and said third cylindrical lens are disposed between said fiber port array and said dispersive element.

19. The wavelength selective switch of claim 17, wherein said third cylindrical lens is positioned between said fiber port array and said dispersive element, wherein said position is substantially one focal length of said third cylindrical lens from said dispersive element.

20. The wavelength selective switch of claim 17, wherein said third cylindrical lens is operable in one of said switching and dispersive planes and substantially passive in the other.

21. The wavelength selective switch of claim 17, wherein said third cylindrical lens comprises a focal length substantially equal the sum of substantially one focal length of said first cylindrical lens and substantially one focal length of said second cylindrical lens.

22. The wavelength selective switch of claim 21, wherein said focal length of said first spherical lens and said focal length of said second spherical lens are both optimized for the purpose of reducing a tilt requirement of said switching element necessary for directing the one or more optical signals between said fiber ports.

23. The wavelength selective switch of claim 21, wherein said focal length of said first spherical lens is derived based on balancing a tilt requirement of said switching element and a height to width aspect ratio of said switching element.

24. The wavelength selective switch of claim 17, wherein said first and said second cylindrical lenses produce one or more optical signals that propagate generally parallel to an optical axis in a telecentric fashion after said first and said second cylindrical lenses in one of said switching and said dispersive planes.

25. The wavelength selective switch of claim 17, wherein said first and said second cylindrical lens design parameters enable said at least one spherical lens to produce convergent optical signals proximate said switching element in at least one of said switching and said dispersive generally orthogonal planes.

26. The wavelength selective switch of claim 17, wherein said first and said second cylindrical lenses are operable in one of said switching and said dispersive planes and substantially passive in the other.

27. The wavelength selective switch of claim 17, wherein said first and said second spherical lenses are disposed between said fiber port array and said first cylindrical lens.

28. The wavelength selective switch of claim 17, wherein said first cylindrical lens and said second cylindrical lens are positioned proximate each side of a local beam waist of the one or more optical signals, and wherein said positioning from said beam waist is a focal length of each said cylindrical lens in one of said switching and said dispersive planes and not the other.

29. The wavelength selective switch of claim 1, wherein said at least one spherical lens is positioned between said dispersive element and said switching element, and wherein said position is substantially at one focal length of said at least one spherical lens from said dispersive element and said switching element.

30. The wavelength selective switch of claim 1, wherein said at least one spherical lens simultaneously creates convergent optical signals in one of said switching and dispersive planes and telecentric optical signals in the other.

31. The wavelength selective switch of claim 1, wherein said switching element further comprises a height to width aspect ratio of 10 or less.

32. The wavelength selective switch of claim 1, further comprising a beam steering element operable to steer the one or more optical signals within said plurality of fiber ports arranged in a fiber port array.

33. The wavelength selective switch of claim 32, wherein said beam steering element further comprises one or more facets of an integrated monolithic element.

34. The wavelength selective switch of claim 33, wherein said one or more facets is operable to converge a common wavelength from said plurality of fiber ports on to a specific wavelength-associated switching element.

35. The wavelength selective switch of claim 32, wherein said beam steering element is selected from a group consisting of optical prisms, reflectors, diffractive elements, holographic elements, liquid crystals, liquid crystals on silicon, and combinations thereof.

36. The wavelength selective switch of claim 32, wherein said beam steering element is operable to converge a common wavelength from said plurality of fiber ports on to a specific wavelength-associated switching element.

37. The wavelength selective switch of claim 1, wherein said fiber port array comprises a two-dimensional fiber port array having a plurality of columns of fiber ports, and further comprising a beam steering element operable to steer the one or more optical signals within one said column of fiber ports of said plurality of columns of fiber ports.

38. The wavelength selective switch of claim 37, wherein said beam steering element further comprises one or more facets of an integrated monolithic element, at least one facet of said one or more facets is operable to steer the one or more optical signals within said column of fiber ports of said plurality of columns of fiber ports.

39. The wavelength selective switch of claim 1, wherein said switching element is an array of MEMS mirrors.

40. The wavelength selective switch of claim 1, wherein said plurality of optical elements further comprises at least one quarter wave plate included in said plurality of optical elements to reduce polarization dependent loss.

41. The wavelength selective switch of claim 40, wherein said at least one quarter wave plate is combined with a lens or a mirror, to form one of said optical elements.

42. The wavelength selective switch of claim 40, wherein said at least one quarter wave plate is used as a protective transparent cover for said switching element.

43. The wavelength selective switch of claim 1, further comprising an optical power monitor.

44. The wavelength selective switch of claim 1, wherein said optical elements further comprise at least one beam steering element configured within said plurality of optical elements and wherein said plurality of fiber ports is further arranged in a two dimensional fiber port array, and wherein the optical signal reflecting from a dual axis switching element is steered by said at least one beam steering element to one of said plurality of fiber ports.

45. The wavelength selective switch of claim 44, wherein said two dimensional fiber port array is further arranged in a plurality of columns of fiber ports.

46. The wavelength selective switch of claim 44, wherein said beam steering element is operable to converge a common wavelength from one or more fiber ports of said plurality of fiber ports on to a specific wavelength-associated switching element.

47. The wavelength selective switch of claim 46, wherein said dual axis switching element is operable in a first axis to switch at least one wavelength from said specific wavelength-associated switching element to one select fiber port of said plurality of fiber ports.

48. The wavelength selective switch of claim 46, wherein said dual axis switching element is operable in a second axis to control power equalization of the one or more optical signals.

49. The wavelength selective switch of claim 1, wherein the same wavelengths from the one or more optical signals overlap one another to share an optical aperture of at least one of said plurality of optical elements, without cross talk between the same wavelengths.

50. A wavelength selective switch for switching wavelengths from one or more optical signals, the signal comprising one or more optical wavelengths, each constituting a work piece, the wavelength selective switch comprising:
  a plurality of fiber ports arranged in a fiber port array;
  a dispersive element operable with said plurality of fiber ports to separate at least one optical signal into a plurality of wavelength components;
  a plurality of optical elements operable with said plurality of fiber ports, wherein said plurality of optical elements further comprises at least three cylindrical lenses positioned in front of said dispersive element, wherein at least two of said at least three cylindrical lenses has power in a switching plane at least one other of said at least three cylindrical lenses has power in a dispersive plane;
  said plurality of optical elements further comprises at least one spherical lens positioned in back of said dispersive element, wherein said at least one spherical lens has power in both said switching plane and said dispersive plane;
  at least one beam steering element operable to steer the one or more optical signals within said plurality of fiber ports arranged in said fiber port array; and
  a switching element operable with the plurality of wavelength components and controllable to guide a selected one of the plurality of wavelength components to a selected one of said plurality of fiber ports,
  wherein said at least two of said at least three cylindrical lenses, said at least one spherical lens, and said switching element affects an optical properly of at least one optical signal in said switching plane, and wherein said at least one other of said at least three cylindrical lenses, said at least one spherical lens, said at least one beam steering element, and said dispersive element affects an optical properly of said at least one optical signal in said dispersive plane, said switching plane being generally orthogonal to said dispersive plane.

51. The wavelength selective switch of claim 50, wherein said plurality of optical elements comprises at least one said optical element performing in a telescopic manner.

52. A wavelength selective switch for switching wavelengths from one or more optical signals, the signal comprising one or more optical wavelengths, each constituting a work piece, the wavelength selective switch comprising:
  a plurality of fiber ports arranged in a two dimensional fiber port array having a plurality of columns of fiber ports;
  a dispersive element operable with said plurality of fiber ports to separate at least one optical signal into a plurality of wavelength components;
  a plurality of optical elements operable with said plurality of fiber ports, wherein said plurality of optical elements further comprises at least three cylindrical lenses positioned in front of said dispersive element, wherein at least two of said at least three cylindrical lenses has power in a switching plane and at least one other of said at least three cylindrical lenses has power in a dispersive plane;

said plurality of optical elements further comprises at least one spherical lens positioned in back of said dispersive element, wherein said at least one spherical lens has power in both said switching plane and said dispersive plane;

a switching element operable with the plurality of wavelength components and controllable to guide a selected one of the plurality of wavelength components to a selected one of said plurality of fiber ports; and at least one beam steering element operable to steer the one or more optical signals from said plurality of fiber ports to said switching element, and from said switching element to said plurality of fiber ports;

wherein said at least two of said at least three cylindrical lenses, said at least one spherical lens, and said switching element affects an optical properly of at least one optical signal in said switching plane, and wherein said one other of said at least three cylindrical lenses, said at least one spherical lens, said at least one beam steering element, and said dispersive element affects an optical properly of said at least one optical signal in said dispersive plane, said switching plane being generally orthogonal to said dispersive plane.

53. The wavelength selective switch of claim 52, wherein said switching element further comprises an array of mirrors, wherein each mirror in said array of mirrors is configured to tilt about two axes, one axis in said switching plane and the other axis in said dispersive plane.

54. The wavelength selective switch of claim 53, wherein said switching element, said beam steering element, and said two dimensional fiber port array are configured to selectively steer at least one wavelength from a column of fiber ports of said plurality of fiber ports to a different column of fiber ports of said plurality of fiber ports.

55. The wavelength selective switch of claim 52, wherein said plurality of optical elements comprises at least one said optical element performing in a telescopic manner.

56. The wavelength selective switch of claim 52, wherein said beam steering element further comprises one or more facets of an integrated monolithic element, at least one facet of said one or more facets is operable to steer the one or more optical signals within said fiber ports of said plurality of fiber ports.

57. A method for optimizing optical switch performance comprising the steps of:

providing a plurality of fiber ports arranged in a fiber port array, a dispersive element operable with said plurality of fiber ports to separate at least one optical signal into a plurality of wavelength components, a plurality of optical elements operable with said plurality of fiber ports, wherein said plurality of optical elements further comprises at least three cylindrical lenses positioned in front of said dispersive element, wherein at least two of said at least three cylindrical lenses has power in a switching plane and at least one other of said at least three cylindrical lenses has power in a dispersive plane, said plurality of optical elements further comprises at least one spherical lens positioned in back of said dispersive element, wherein said at least one spherical lens has power in both said switching plane and said dispersive plane, and a switching element operable with the plurality of wavelength components and controllable to guide a selected one of the plurality of wavelength components to a selected one of said plurality of fiber ports, wherein said at least two of said at least three cylindrical lenses, said at least one spherical lens, and said switching element affects an optical properly of at least one optical signal in said switching plane, and wherein said at least one other of said at least three cylindrical lenses, at least one spherical lens, and said dispersive element affects an optical properly of said at least one optical signal in said dispersive plane, said switching plane being generally orthogonal to said dispersive plan; and, positioning at least one of said dispersive element, said switching element, and said fiber port array at a focal point of at least one of said plurality of optical elements in at least one plane of said switching and said dispersive planes.

58. The method of claim 57, wherein said positioning of said at least one of said dispersive element, said switching element, and said fiber port array further comprises the step of reducing a design constraint of at least one of said plurality of optical elements, said dispersive element, and said switching element.

59. The method of claim 57, further comprising the step of providing at least one optical element of said plurality of optical elements performing in a telescopic manner, wherein said optical element performing in a telescopic manner further comprises the step of reducing a design constraint of at least one of said plurality of optical elements, said dispersive element, and said switching element.

60. The method of claim 59, further comprising the step of minimizing a focal length of said at least one optical element performing in a telescopic manner, wherein said minimizing reduces a tilt requirement of said switching element necessary for directing the one or more optical signals between said fiber ports.

61. The method of claim 57, further comprising the step of producing one or more optical signals that propagate generally parallel to an optical axis of said switch in a telecentric fashion in at least one of said switching and said dispersive planes.

62. The method of claim 57, further comprising the step of producing one or more optical signals that propagate generally parallel to each other in a telecentric fashion as the one or more optical signals approach said switching element in one of said switching and said dispersive planes.

63. The method of claim 57, further comprising the step of creating convergent optical signals in at least one of said switching and said dispersive planes and creating telecentric beams in the other.

64. The method of claim 57, further comprising the step of independently magnifying the one or more optical signals in at least one of said switching and dispersive planes, wherein said independent magnification in at least one of said switching and dispersive generally enables optimization of performance of an element selected from the group consisting of at least one of said plurality of optical elements, said dispersive element, and said switching element in at least one of said switching and dispersive planes.

65. The method of claim 57, further comprising the step of independently magnifying the one or more optical signals in at least one of said two generally orthogonal planes, wherein said magnifying reduces a design constraint of at least one element selected from the group consisting of said plurality of optical elements, said dispersive element, and said switching element.

66. The method of claim 57, wherein said step of positioning at least one of said plurality of optical elements, said dispersive element, said switching element in at least one of said two generally orthogonal planes, provides an additional degree of design freedom by relaxing a performance requirement on an element selected from the group consisting of at least one of said plurality of optical elements, said dispersive element, and said switching element.

67. The method of claim 57, wherein said step of positioning at least one of said dispersive element, said switching element, and said fiber port array proximate a location corresponding to at least one focal point of at least one of said plurality of optical elements in both of said two generally orthogonal planes provides an additional degree of design freedom by relaxing a performance requirement of an element selected from the group consisting of at least one of said plurality of optical elements, said dispersive element, and said switching element.

68. The method of claim 57, further comprising the step of increasing a size of the optical signal proximate said dispersive element, thereby relaxing a performance requirement on said dispersive element.

69. A method for increasing an optical switch fiber port count comprising the steps of:
providing a plurality of fiber ports arranged in a two dimensional fiber port array, a dispersive element operable with said plurality of fiber ports to separate at least one optical signal into a plurality of wavelength components, a plurality of optical elements operable with said plurality of fiber ports, wherein said plurality of optical elements further comprises at least three cylindrical lenses positioned in front of said dispersive element, wherein at least two of said at least three cylindrical lenses has power in a switching plane and at least one other of said at least three cylindrical lenses has power in a dispersive plane, said plurality of optical elements further comprises at least one spherical lens positioned in back of said dispersive element, wherein said at least one spherical lens has power in both said switching plane and said dispersive plane, a switching element operable with the plurality of wavelength components and controllable to guide a selected one of the plurality of wavelength components to a selected one of said plurality of fiber ports, and at least one beam steering element operable to steer the one or more optical signals within said plurality of fiber ports, wherein said at least two of said at least three cylindrical lenses, at least one spherical lens and said switching element affects an optical properly of at least one optical signal in said switching plane, and wherein said at least one of said at least three cylindrical lenses, said at least one spherical lens, said at least one beam steering element, and said dispersive element affects an optical properly of said at least one optical signal in said dispersive plane, said switching plane being generally orthogonal to said dispersive plane; and,
positioning at least one of said dispersive element, said switching element, said beam steering element, and said two dimensional fiber port array at a focal point of at least one of said plurality of optical elements in at least one plane of said switching and said dispersive generally orthogonal planes.

70. The method of claim 69, further comprising the step of providing at least one optical element of said plurality of optical elements performing in a telescopic manner, wherein said optical element performing in a telescopic manner further comprises the step of reducing a design constraint of at least one of said plurality of optical elements, said dispersive element, said beam steering element, and said switching element.

71. The method of claim 70, further comprising the step of minimizing a focal length of said at least one optical element performing in a telescopic manner, wherein said minimizing reduces a tilt requirement of said switching element necessary for directing the one or more optical signals between said fiber ports.

72. The method of claim 69, wherein said switching element further comprises an array of mirrors, wherein each mirror in said array of mirrors is configured to tilt about two axes, one axis in said switching plane and the other axis in said dispersive plane of said switching and said dispersive planes.

73. The method of claim 69, further comprising the step of producing optical signals that propagate generally parallel to an optical axis of said switch in a telecentric fashion in at least one of said switching and said dispersive planes.

74. The method of claim 69, further comprising the step of producing optical signals that propagate generally parallel to each other in a telecentric fashion as the one or more optical signals approach said switching element in one of said switching and said dispersive planes.

75. The method of claim 69, further comprising the step of creating convergent optical signals in at least one of said switching and said dispersive planes and creating telecentric beams in the other.

76. The method of claim 69, further comprising the step of independently magnifying the one or more optical signals in at least one of said switching and dispersive planes, wherein said independent magnification in at least one of said switching and dispersive planes enables optimization of performance of an element selected from the group consisting of at least one of said plurality of optical elements, said dispersive element, said beam steering element, and said switching element in at least one of said switching and dispersive planes.

77. The method of claim 69, further comprising the step of independently magnifying the one or more optical signals in at least one of said two generally orthogonal planes, wherein said magnifying reduces a design constraint of at least one element selected from the group consisting of said plurality of optical elements, said dispersive element, said beam steering element, and said switching element.

78. The method of claim 69, wherein said positioning of said plurality of optical elements, said dispersive element, said beam steering element, said switching element in at least one of said two generally orthogonal planes, further comprises the step of reducing a design constraint of an element selected from the group consisting of at least one of said plurality of optical elements, said dispersive element, said beam steering element, and said switching element.

79. The method of claim 69, further comprising the step of positioning at least one of said dispersive element, said beam steering element, said switching element, and said fiber port array proximate a location corresponding to at least one focal point of at least one of said plurality of optical elements in at least one of said two generally orthogonal planes, wherein said positioning reduces a design constraint of an element selected from the group consisting of at least one of said plurality of optical elements, said dispersive element, said beam steering element, and said switching element.

80. The method of claim 69, further comprising the step of increasing a size of the one or more optical signals proximate said dispersive element, thereby relaxing a performance requirement on said dispersive element.

* * * * *